US012802576B2

(12) United States Patent
Groden et al.

(10) Patent No.: US 12,802,576 B2
(45) Date of Patent: Nov. 17, 2026

(54) USER INTERFACE FOR AUTOMATED FLIGHT

(71) Applicant: Skyryse, Inc., El Segundo, CA (US)

(72) Inventors: Mark Daniel Groden, Marina Del Rey, CA (US); Chaitanyakumar Vipulbhai Shah, Los Angeles, CA (US); Christina Marie Hicks, Santa Fe, NM (US); Christopher Camilo Cole, Santa Monica, CA (US); Gonzalo Javier Rey, Torrance, CA (US)

(73) Assignee: Skyryse, Inc., El Segundo, CA (US)

( * ) Notice: Subject to any disclaimer, the term of this patent is extended or adjusted under 35 U.S.C. 154(b) by 59 days.

(21) Appl. No.: 18/773,450

(22) Filed: Jul. 15, 2024

(65) Prior Publication Data

US 2025/0022379 A1 Jan. 16, 2025

Related U.S. Application Data

(60) Provisional application No. 63/526,624, filed on Jul. 13, 2023.

(51) Int. Cl.
*G08G 5/50* (2025.01)
*B64C 19/02* (2006.01)
(Continued)

(52) U.S. Cl.
CPC ............... *G08G 5/50* (2025.01); *B64C 19/02* (2013.01); *G06F 3/04883* (2013.01); *G06F 9/451* (2018.02); *G08G 5/55* (2025.01)

(58) Field of Classification Search
CPC .. G08G 5/50; G08G 5/55; G08G 5/00; G08G 5/56; G08G 5/51; G08G 5/54; G06F 9/451; G06F 3/04883; B64C 19/02
See application file for complete search history.

(56) References Cited

U.S. PATENT DOCUMENTS 8,423,207 B2 * 4/2013 Davis ..................... G01C 23/00 701/16
8,532,849 B1 * 9/2013 Tsai ....................... G01C 23/00 340/979
(Continued)

FOREIGN PATENT DOCUMENTS

EP 3315916 A1 5/2018

OTHER PUBLICATIONS

Patent Cooperation Treaty, International Search Report and Written Opinion, PCT Patent Application No. PCT/US2024/038104, Aug. 12, 2025, 32 pages.

*Primary Examiner* — Manglesh M Patel
(74) *Attorney, Agent, or Firm* — Fenwick & West LLP

(57) ABSTRACT

A vehicle control and interface system described herein assists an operator of an aerial vehicle with the operation of an aerial vehicle, including automated control of the aerial vehicle during flight. The system can generate a graphical user interface (GUI) on which lateral guidance and vertical guidance initiation elements are displayed. The system can conditionally disable the vertical guidance initiation element from operator interaction until at least the operator interacts with the lateral guidance initiation element (e.g., to prevent an undesirable roll maneuver during descent). If the operator interacts with the vertical guidance initiation element before engaging lateral guidance, the aerial vehicle may maintain a current altitude rather than climb or descend according to a target vertical guidance route. In this way, the GUI reformats elements based on the operational state of the aerial vehicle and reduces a risk of operational error.

20 Claims, 9 Drawing Sheets

(51) Int. Cl.
*G06F 3/04883* (2022.01)
*G06F 9/451* (2018.01)
*G08G 5/55* (2025.01)

(56) References Cited

U.S. PATENT DOCUMENTS

| | | | | |
|---|---|---|---|---|
| 9,691,287 | B1 | 6/2017 | Shapiro et al. | |
| 11,004,347 | B1 * | 5/2021 | Byxbe | B64D 43/00 |
| 2006/0143575 | A1 * | 6/2006 | Sauermann | G06F 3/038 715/811 |
| 2007/0240062 | A1 * | 10/2007 | Christena | G06F 3/04842 715/741 |
| 2009/0177341 | A1 * | 7/2009 | Deker | G05D 1/101 701/11 |
| 2013/0135202 | A1 | 5/2013 | Louise-Babando et al. | |
| 2016/0179327 | A1 * | 6/2016 | Zammit-Mangion | G05D 1/101 701/3 |
| 2017/0323573 | A1 * | 11/2017 | Decker | B64D 31/02 |
| 2020/0082729 | A1 * | 3/2020 | Heiberg | G05D 1/87 |
| 2020/0327815 | A1 * | 10/2020 | Frenot | G08G 5/54 |
| 2022/0208012 | A1 * | 6/2022 | Samuthirapandian | G01C 23/00 |
| 2024/0385616 | A1 * | 11/2024 | Flanzer | G01C 23/00 |

* cited by examiner

USER INTERFACE FOR AUTOMATED FLIGHT

CROSS REFERENCE TO RELATED APPLICATIONS

This application claims the benefit of U.S. Provisional Application No. 63/526,624, filed Jul. 13, 2023, which is incorporated by reference herein in its entirety.

TECHNICAL FIELD

The disclosure generally relates to the field of vehicle control systems, and particularly to navigation control and interface systems for aerial vehicles.

BACKGROUND

Vehicle control and interface systems, such as control systems for aerial vehicles (e.g., rotorcraft or fixed wing aerial vehicle), often require specialized knowledge and training for operation by a human operator. The specialized knowledge and training is necessitated, for instance, by the complexity of the control systems and safety requirements of the corresponding vehicles. Moreover, vehicle control and interface systems are specifically designed for types or versions of certain vehicles. For example, specific rotorcraft and fixed wing aerial vehicle control systems are individually designed for their respective contexts. As such, even those trained to operate one vehicle control system may be unable to operate another control system for the same or similar type of vehicle without additional training. Although some conventional vehicle control systems provide processes for partially or fully automated vehicle control, such systems are still designed for individual vehicle contexts.

Conventional automated control interfaces can be complex. There may be an autopilot mode for each axis of control for an aerial vehicle. Some examples of autopilot modes include an attitude hold, altitude hold, airspeed hold, vertical-speed hold, and a wing level hold. The operator should understand when to engage with which autopilot mode to safely operate the plane. Moreover, a plane can have multiple input interfaces for controlling the same operations. For example, an aerial vehicle's control panel, a control stick, and autopilot system may all have access to set an altitude of an aerial vehicle. Conventional autopilot systems may override autopilot entirely when an operator interacts with a control input. This may force a very abrupt mental burden upon the operator, which increases the risk of operational error.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure

DETAILED DESCRIPTION

Figure 1:
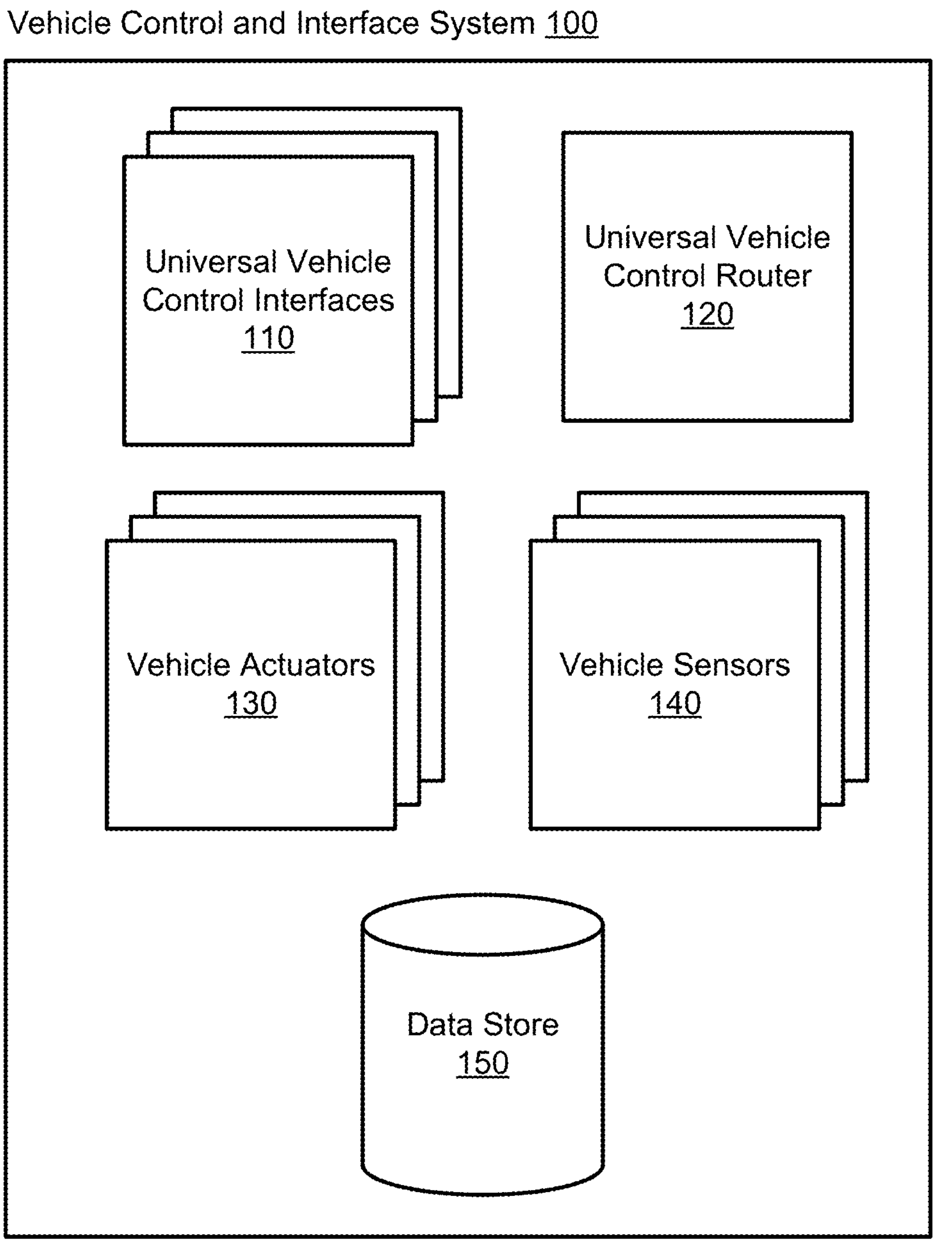
(FIG. 1 illustrates a vehicle control and interface system, in accordance with one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of a disclosed system, method and a non-transitory computer readable storage medium include automated assistance for engine startup, navigation control, and movement of an electrical display screen through which operations can be controlled (e.g., in small fly-by-wire vehicles). A vehicle control and interface system generates a graphical user interface (GUI) that disarms or disables interactable elements depending on current operational parameters of an aerial vehicle and safety determinations. While conventional automated control interfaces are typically separately located from a primary flight display interface (e.g., a separate box with a control head with a number of physical buttons or knobs), the present vehicle control and interface system may integrate an automated control interface with a primary flight display interface. In this way, an operator may concentrate their mental resources on one interface rather than two.

Moreover, conventional automated control interfaces may lack contextual information of what happens once control is automated (e.g., once autopilot is activated). That is, an operator may only know what happens after autopilot is activated and the aerial vehicle begins to react to it. The mental strain on an operator is greater in conventional automated control interfaces, where operators must quickly react to the aerial vehicle's operation as it is happening in real time without any advanced notice of what will happen. This increases a likelihood that an inflight accident may occur. The present vehicle control and interface system provides contextual information of what can happen once control is automated (e.g., an altitude drop by a certain distance). In turn, the vehicle control and interface system is less likely than a conventional system to mentally burden the operator and cause an inflight accident.

Furthermore, the vehicle control and interface system dynamically reformats elements or text within a GUI based upon an operational state of an aerial vehicle (e.g., if the aerial vehicle is presently engaged in a particular autopilot mode). The vehicle control and interface system performs methods that are necessarily rooted in computer technology to overcome a problem specifically arising in conventional GUIs, where buttons for engaging autopilot can be displayed for selection without awareness for what can be selected safely based on the current aerial vehicle operations. For example, engaging in an automated control of vertical speed (vertical) hold before engaging in wing level (lateral) hold may cause an aerial vehicle to lose its wing level stability and begin an unsafe roll maneuver as it climbs or descends. The vehicle control and interface system addresses this shortcoming by reformatting the GUI elements such that GUI elements for engaging certain autopilot modes are conditionally disabled or disarmed unless the aerial vehicle is operating in a manner that those certain autopilot modes can be safely executed. This reformatting provides contextual awareness for the operator and also prevents the operator from endangering themselves and other passengers. The vehicle control and interface system can release or override autopilot on an axis-by-axis basis to decrease the mental burden that is put on an operator when interrupting an automated vehicle control system, which in turn reduces the risk of operational error and increases safety.

Example Vehicle Control and Interface System

FIG. 1 illustrates a vehicle control and interface system 100, in accordance with one embodiment. In the example embodiment shown, vehicle control and interface system 100 includes one or more universal vehicle control interfaces 110, universal vehicle control router 120, one or more vehicle actuators 130, one or more vehicle sensors 140, and one or more data stores 150. In other embodiments, the vehicle control and interface system 100 may include different or additional elements. Furthermore, the functionality may be distributed among the elements in a different manner than described. The elements of FIG. 1 may include one or more computers that communicate via a network or other suitable communication method.

The vehicle control and interface system 100 may be integrated with various vehicles having different mechanical, hardware, or software components. For example, the vehicle control and interface system 100 may be integrated with vehicles such as fixed wing aerial vehicles (e.g., airplanes), rotorcraft (e.g., helicopters, multirotors), spacecraft, motor vehicles (e.g., automobiles), watercraft (e.g., power boats or submarines), or any other suitable vehicle. An aerial vehicle is a machine capable of flight such as airplanes, rotorcraft (e.g., helicopters and/or multi-rotor aerial vehicles), airships, etc. As described in greater detail below with reference to FIGS. 2-6, the vehicle control and interface system 100 is advantageously configured to receive inputs for requested operation of a particular vehicle via universal set of interfaces and the inputs to appropriate instructions for mechanical, hardware, or software components of the particular vehicle to achieve the requested operation. In doing so, the vehicle control and interface system 100 enables human operators to operate different vehicles using the same universal set of interfaces or inputs. By way of example, "universal" indicates that a feature of the vehicle control and interface system 100 may operate in a vehicle-agnostic manner. This allows for vehicle integration without necessarily having to design and configure vehicle specific customizations or reconfigurations in order to integrate the specific feature. Although universal features of the vehicle control and interface system 100 can function in a vehicle-agnostic manner, the universal features may still be configured for particular contexts. For example, the vehicle control or interface system 100 may receive or process inputs describing three-dimensional movements for vehicles that can move in three dimensions (e.g., aerial vehicle) and conversely may receive or process inputs describing two-dimensional movements for vehicles that can move in two dimensions (e.g., automobiles). One skilled in the art will appreciate that other context-dependent configurations of universal features of the vehicle control and interface system 100 are possible.

The universal vehicle control interfaces 110 are a set of universal interfaces configured to receive a set of universal vehicle control inputs to the vehicle control and interface system 100. The universal vehicle control interfaces 110 may include one or more digital user interfaces presented to an operator of a vehicle via one or more electronic displays. Additionally, or alternatively, the universal vehicle control interfaces 110 may include one or more hardware input devices, e.g., one or more control stick inceptors, such as side sticks, center sticks, throttles, cyclic controllers, or collective controllers. The universal vehicle control interfaces 110 receive universal vehicle control inputs requesting operation of a vehicle. In particular, the inputs received by the universal vehicle control interfaces 110 may describe a requested trajectory of the vehicle, such as to change a velocity of the vehicle in one or more dimensions or to change an orientation of the vehicle. Because the universal vehicle control inputs describe an intended trajectory of a vehicle directly rather than describing vehicle-specific precursor values for achieving the intended trajectory, such as vehicle attitude inputs (e.g., power, lift, pitch, roll yaw), the universal vehicle control inputs can be used to universally describe a trajectory of any vehicle. This is in contrast to existing systems where control inputs are received as vehicle-specific trajectory precursor values that are specific to the particular vehicle. Advantageously, any individual interface of the set of universal vehicle control interfaces 110 configured to receive universal vehicle control inputs can be used to completely control a trajectory of a vehicle. This is in contrast to conventional systems, where vehicle trajectory must be controlled using two or more interfaces or inceptors that correspond to different axes of movement or vehicle actuators. For instance, conventional rotorcraft systems include different cyclic (controlling pitch and roll), collective (controlling heave), and pedal (controlling yaw) inceptors. Similarly, conventional fixed-wing aerial vehicle systems include different stick or yoke (controlling pitch and role), power (controlling forward movement), and pedal (controlling yaw) inceptors.

The universal vehicle control interfaces 110 may include one or more digital user interfaces (e.g., graphical user interfaces (GUIs)) presented to an operator of a vehicle via one or more electronic displays. The electronic displays of the universal vehicle control interfaces 110 may include displays that are partially or wholly touch screen interfaces. Examples of GUIs include an interface to prepare the vehicle for operation, an interface to control the navigation of the vehicle, an interface to end operation of the vehicle, any suitable interface for operating the vehicle, or a combination thereof. The GUIs may include user input controls that enable the user to control operation of the vehicle. In some embodiments, the universal vehicle control interfaces 110 include interfaces that provide feedback information to an operator of the vehicle. For instance, the universal vehicle control interfaces 110 may provide information describing a state of a vehicle integrated with the universal vehicle control interfaces 110 (e.g., engine start-up checks, current vehicle speed, direction, orientation, location, etc.). Additionally, or alternatively, the universal vehicle control interfaces 110 may provide information to facilitate navigation or other operations of a vehicle, such as visualizations of maps, terrain, or other environmental features around the vehicle. Examples of GUIs of the universal vehicle control interfaces 110 are described in greater detail with reference to FIGS. 4-7. Examples of processes for using GUIs of the universal vehicle control interfaces 110 are described with reference to FIG. 8.

The universal vehicle control interfaces 110 may include a movable control interface enabling an operator of a vehicle to access an electronic display. The movable control interface may include an electronic display and a mechanical arm coupled to the electronic display. The electronic display may be a touch screen interface. The movable control interface may enable the operator to access both a touch screen interface and a mechanical control stick simultaneously (i.e., performing both activities during at least one shared time). In particular, the movable control interface may be movable to change between various positions, including a stowed position and an in-flight position. In a stowed position, the movable control interface may be farther away from a pilot seat than the movable control interface is in an in-flight position. Furthermore, in an in-flight position, the movable control interface may be located in front of a pilot seat at an elevation relative to the pilot seat such that the touch screen interface is accessible to the operator while the operator is seated fully in the pilot's seat (e.g., with their back contacting the pilot's seat and without leaning forward to reach the touch screen interface).

In various embodiments, inputs received by the universal vehicle control interfaces 110 can include "steady-hold" inputs, which may be configured to hold a parameter value fixed (e.g., remain in a departed position) without a continuous operator input. Such variants can enable hands-free operation, where discontinuous or discrete inputs can result in a fixed, continuous input. In a specific example, a user of the universal vehicle control interfaces 110 can provide an input (e.g., a speed input) and subsequently remove their hands with the input remaining fixed. Alternatively, or additionally, inputs received by the universal vehicle control interfaces 110 can include one or more self-centering or automatic return inputs, which return to a default state without a continuous user input.

The universal vehicle control router 120 routes universal vehicle control inputs describing operation of a vehicle to components of the vehicle suitable for executing the operation. In particular, the universal vehicle control router 120 receives universal vehicle control inputs describing the operation of the vehicle, processes the inputs using information describing characteristics of the vehicle, and outputs a corresponding set of commands for actuators of the vehicle (e.g., the vehicle actuators 130) suitable to achieve the operation. The universal vehicle control router 120 may use various information describing characteristics of a vehicle in order to convert universal vehicle control inputs to a suitable set of commands for actuators of the vehicle. Additionally, or alternatively, the universal vehicle control router 120 may convert universal vehicle control inputs to a set of actuator commands using a set of control laws that enforce constraints (e.g., limits) on operations requested by the universal control inputs. For example, the set of control laws may include velocity limits (e.g., to prevent stalling in fixed-wing aerial vehicle), acceleration limits, turning rate limits, engine power limits, rotor revolution per minute (RPM) limits, load power limits, allowable descent altitude limits, etc. After determining a set of actuator commands, the universal vehicle control router 120 may transmit the commands to relevant components of the vehicle for causing corresponding actuators to execute the commands. Embodiments of the universal vehicle control router 120 are described in greater detail below with reference to FIG. 2.

The universal vehicle control router 120 can decouple axes of movement for a vehicle in order to process received universal vehicle control inputs. In particular, the universal vehicle control router 120 can process a received universal vehicle control input for one axis of movement without impacting other axes of movement such that the other axes of movement remain constant. In this way, the universal vehicle control router 120 can facilitate "steady-hold" vehicle control inputs, as described above with reference to the universal vehicle control interfaces 110. This is in contrast to conventional systems, where a vehicle operator must manually coordinate all axes of movement independently for a vehicle in order to produce movement in one axis (e.g., a pure turn, a pure altitude climb, a pure forward acceleration, etc.) without affecting the other axes of movement.

In some embodiments, the universal vehicle control router 120 is configured to use one or more models corresponding to a particular vehicle to convert universal vehicle control inputs to a suitable set of commands for actuators of the vehicle. For example, a model may include a set of parameters (e.g., numerical values) that can be used as input to universal input conversion processes in order to generate actuator commands suitable for a particular vehicle. In this way, the universal vehicle control router 120 can be integrated with vehicles by substituting models used by processes of the universal vehicle control router 120, enabling efficient integration of the vehicle control and interface system 100 with different vehicles. The one or more models may be obtained by the universal vehicle control router 120 from a vehicle model database or other first-party or third-party system, e.g., via a network. In some cases, the one or more models may be static after integration with the vehicle control and interface system 100, such as if a vehicle integrated with the vehicle control and interface system 100 receives is certified for operation by a certifying authority (e.g., the United States Federal Aviation Administration). In some embodiments, parameters of the one or more models are determined by measuring data during real or simulated operation of a corresponding vehicle and fitting the measured data to the one or more models.

In some embodiments, the universal vehicle control router 120 processes universal vehicle control inputs according to a current phase of operation of the vehicle. For instance, if the vehicle is a rotorcraft, the universal vehicle control router 120 may convert a universal input describing an increase in lateral speed to one or more actuator commands differently if the rotorcraft is in a hover phase or in a forward flight phase. In particular, in processing the lateral speed increase universal input the universal vehicle control router 120 may generate actuator commands causing the rotorcraft to strafe if the rotorcraft is hovering and causing the rotorcraft to turn if the rotorcraft is in forward flight. As another example, in processing a turn speed increase universal input the universal vehicle control router 120 may generate actuator commands causing the rotorcraft to perform a pedal turn if the rotorcraft is hovering and ignore the turn speed increase universal input if the rotorcraft is in another phase of operation. As a similar example for a fixed-wing aerial vehicle, in processing a turn speed increase universal input the universal vehicle control router 120 may generate actuator commands causing the fixed-wing aerial vehicle to perform tight ground turn if the fixed-wing aerial vehicle is grounded and ignore the turn speed increase universal input if the fixed-wing aerial vehicle is in another phase of operation. One skilled in the art will appreciate that the universal vehicle control router 120 may perform other suitable processing of universal vehicle control inputs to generate actuator commands in consideration of vehicle operation phases for various vehicles.

The universal vehicle control router 120 may comprise multiple flight control computers configured to provide instructions to vehicle actuators 130 in a redundant configuration. Each flight control computer may be independent, such that no single failure affects multiple flight control computer simultaneously. Each flight control computer may comprise a processor, multiple control modules, and a FAT voter. Each flight control computer may be associated with a backup battery. Each flight control computer may comprise a self-assessment module that inactivates the FCC in the event that the self-assessment module detects a failure. The FAT voters may work together to vote on which FCCs should be enabled.

The vehicle actuators 130 are one or more actuators configured to control components of a vehicle integrated with the universal vehicle control interfaces 110. For instance, the vehicle actuators may include actuators for controlling a power-plant of the vehicle (e.g., an engine). Furthermore, the vehicle actuators 130 may vary depending on the particular vehicle. For example, if the vehicle is a rotorcraft the vehicle actuators 130 may include actuators for controlling lateral cyclic, longitudinal cyclic, collective, and pedal controllers of the rotorcraft. As another example, if the vehicle is a fixed-wing aerial vehicle the vehicle actuators 130 may include actuators for controlling a rudder, elevator, ailerons, and power-plant of the fixed-wing aerial vehicle. Each vehicle actuator 130 may comprise multiple motors configured to move the vehicle actuator 130. Each motor for a vehicle actuator 130 may be controlled by a different FCC. Every vehicle actuator 130 may comprise at least one motor controlled by each FCC. Thus, any single FCC may control every vehicle actuator 130 on the vehicle.

The vehicle sensors 140 are sensors configured to capture corresponding sensor data. In various embodiments the vehicle sensors 140 may include, for example, one or more global positioning system (GPS) receivers, inertial measurement units (IMUs), accelerometers, gyroscopes, magnometers, pressure sensors (altimeters, static tubes, pitot tubes, etc.), temperature sensors, vane sensors, range sensors (e.g., laser altimeters, radar altimeters, lidars, radars, ultrasonic range sensors, etc.), terrain elevation data, geographic data, airport or landing zone data, rotor revolutions per minute (RPM) sensors, manifold pressure sensors, or other suitable sensors. In some cases, the vehicle sensors 140 may include, for example, redundant sensor channels for some or all of the vehicle sensors 140. The vehicle control and interface system 100 may use data captured by the vehicle sensors 140 for various processes. By way of example, the universal vehicle control router 120 may use vehicle sensor data captured by the vehicle sensors 140 to determine an estimated state of the vehicle.

The data store 150 is a database storing various data for the vehicle control and interface system 100. For instance, the data store 150 may store sensor data (e.g., captured by the vehicle sensors 140), vehicle models, vehicle metadata, or any other suitable data.

Example Control Router with Redundant Flight Control Computers

Figure 2:
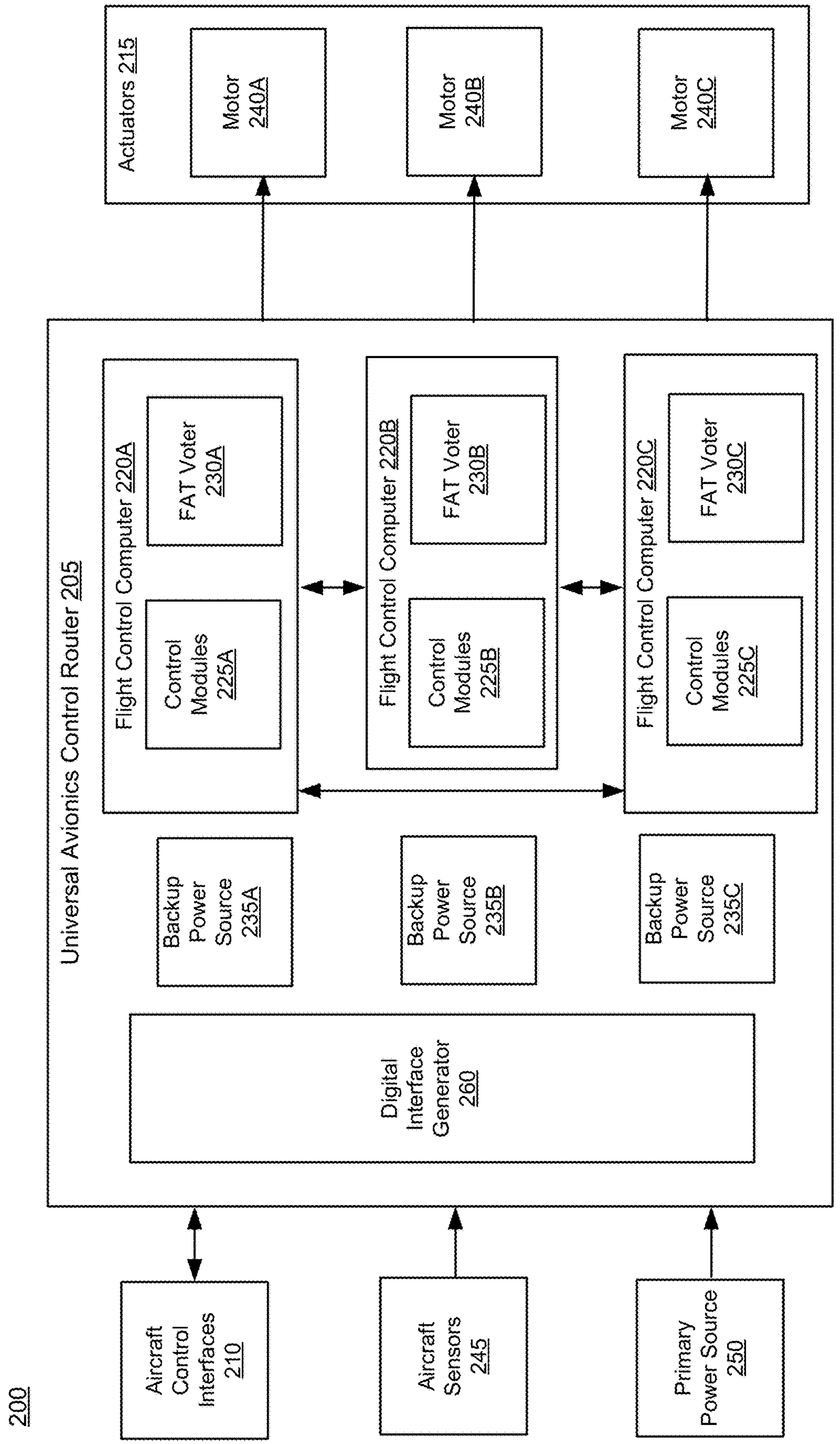
FIG. 2 illustrates one embodiment of a schematic diagram for a universal avionics control router in a redundant configuration, in accordance with one or more embodiments.

FIG. 2 illustrates one embodiment of a schematic diagram 200 for a universal avionics control router 205 in a redundant configuration, in accordance with one embodiment. The universal avionics control router 205 may be an embodiment of the universal vehicle control router 120. Although the embodiment depicted in FIG. 2 is particularly directed to operating an aerial vehicle (e.g., a rotorcraft or fixed wing aerial vehicle), one skilled in the art will appreciate that similar systems can be used with other vehicles, such as motor vehicles or watercraft.

Aerial vehicle control interfaces 210 are configured to provide universal aerial vehicle control inputs to the universal avionics control router 205. The aerial vehicle control interfaces 210 may be embodiments of the universal vehicle control interfaces 110. In particular, the aerial vehicle control interfaces 210 may include an inceptor device, a gesture interface, and an automated control interface. The aerial vehicle control interfaces 210 may be configured to receive instructions from a human pilot as well as instructions from an autopilot system and convert the instructions into universal aerial vehicle control inputs to the universal avionics control router 205. At a given time, the universal aerial vehicle control inputs may include inputs received from some or all of the aerial vehicle control interfaces 210. Inputs received from the aerial vehicle control interfaces 210 are routed to the universal avionics control router 205. The aerial vehicle control interfaces 210 may generate multiple sets of signals, such as one set of signals for each flight control channel via separate wire harnesses and connectors. Inputs received by the aerial vehicle control interfaces 210 may include information for selecting or configuring automated control processes, such as automated aerial vehicle control macros (e.g., macros for aerial vehicle takeoff, landing, or autopilot) or automated mission control (e.g., navigating an aerial vehicle to a target location in the air or ground).

The universal avionics control router 205 includes a digital interface generator 260 that is configured to generate and update one or more graphical user interfaces (GUIs) of the aerial vehicle control interfaces 210. The digital interface generator 260 may be a software module executed on a computer of the universal avionics control router 205. The digital interface generator 260 may generate an interface to prepare the vehicle for operation, an interface to control the navigation of the vehicle, an interface to end the operation of the vehicle, any suitable interface for controlling operation of the vehicle, or a combination thereof. The digital interface generator 260 may update the generated GUIs based on measurements taken by the aerial vehicle sensors 245, user inputs received via the aerial vehicle control interfaces 210, or a combination thereof. In particular, the digital interface generator 260 may update the generated GUIs based on determinations by one or more of the flight control computers 220A, 220B, 220C (collectively 220).

Figure 4:
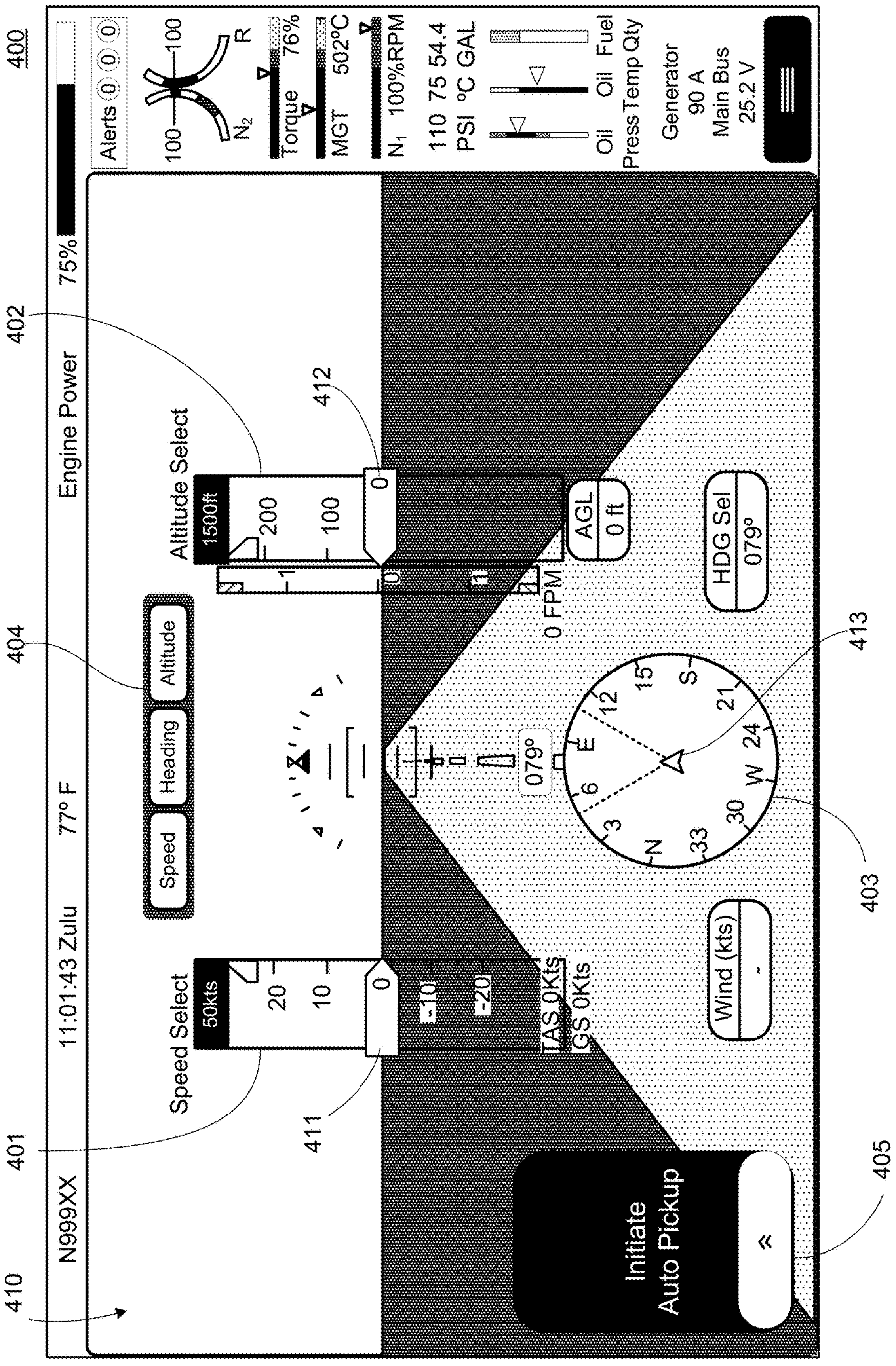
FIG. 4 shows a graphical user interface (GUI) for automating pickup, in accordance with one embodiment.
Figure 5:
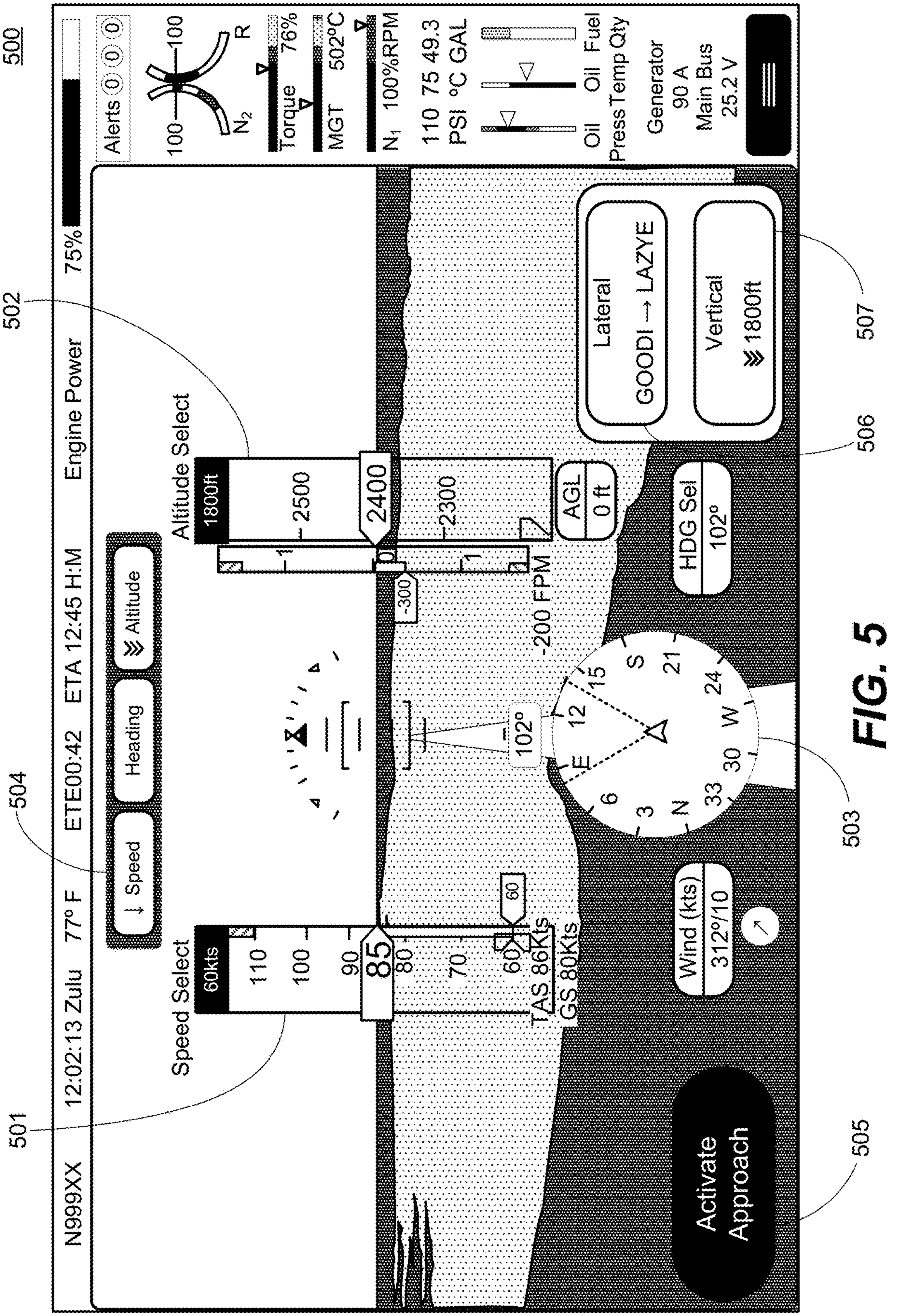
FIG. 5 shows a GUI for initiating approach activation, in accordance with one embodiment.

The universal avionics control router 205 enables automated vehicle control functions. The universal avionics control router 205 can enable automated vehicle control functions for aerial vehicles referred to as "AutoFlight Functions." AutoFlight Functions can include an automated pickup ("Auto Pickup"), an automated setdown ("Auto Setdown"), preselected speed, altitude, or heading bug, or automated navigation guidance ("FlightPlan Guidance"). Auto Pickup and Auto Setdown functions may provide the operator of the aerial vehicle, particularly a hovering vehicle such as a helicopter, with the ability to take the vehicle from the ground to a hovering position (e.g., holding an altitude of at least three feet from the ground) or set down the vehicle to ground from a hovering position. The universal avionics control router 205 may receive a swiping gesture interaction at a touchscreen of the aircraft control interfaces 210 to engage Auto Pickup or Auto Setdown. An example of a GUI including an Auto Pickup element is shown at FIG. 4. An example of a GUI including an Auto Setdown element is shown at FIG. 5.

The universal avionics control router 205 may enable a preselected bug ("Bug Preselect"). The Bug Preselect allows the operator of the aerial vehicle to select a target value (i.e., set a bug) for an operational parameter of the vehicle (e.g., speed, altitude, or heading). In one embodiment, the operator initiates Bug Preselect from a touch screen of the aircraft control interfaces 210. The universal avionics control router 205 may incorporate bug value limits into generated GUIs so that the operator does not select values exceeding operating limits of the airframe. The digital interface generator 260 may generate interactable GUI elements (e.g., tapes or wheels) that can be used to select a bug using a gesture on a touch screen. Examples of Bug Preselect elements are shown in FIGS. 4-7.

The universal avionics control router 205 may enable an automated navigation guidance, or FlightPlan Guidance. The automated navigation guidance helps to guide an aerial vehicle through procedures for maneuvering the vehicle (e.g., instrument approaches, missed approaches, or departures). The universal avionics control router 205 may generate a prompt (e.g., using the digital interface generator 260) requesting an operator provide a flight plan. The flight plan contains information about flight routes, waypoints, altitude, and procedure details. The flight plan can serve as a foundation for the automated navigation guidance and help pilots navigate through different phases of the flight. With the flight plan, the automated navigation guidance may automatically adjust the appropriate instruments and change the navigation source as required. For example, when transitioning from GPS to instrument landing system (ILS) during an approach, the automated navigation guidance will automatically change the navigation source, tune the appropriate frequency in the navigation (NAV) radio, and set the desired course outbound (OBS). Thus, the automated navigation guidance enhances flight efficiency and safety while reducing pilot workload.

The automated navigation guidance may include GUI elements for lateral navigation (Lateral) and vertical navigation (Vertical). The digital interface generator 260 may generate a lateral guidance initiation element and a vertical guidance initiation element. These elements may be buttons displayed at a touchscreen interface (e.g., as shown on FIG. 6). The digital interface generator 260 may maintain the buttons in various display states: disabled, disarmed, armed, and engaged. In a disabled state, the button may be hidden or not generated for display. In a disarmed state, the button may be generated for display but not operator interactable. In an armed state, the button may be generated for display, operator interactable, but not yet interacted to cause a change in the vehicle's operation (e.g., interacted with to cause automated control of an axis of the aerial vehicle). In an engaged state, the button may be generated for display and the operated has interacted with it to cause a change in the vehicle's operation (e.g., an automated control of an axis of the aerial vehicle is activated).

The universal avionics control router 205 makes determinations on whether certain automated navigation guidance functions (e.g., Lateral or Vertical control) can be engaged or not based on various conditions, such as the aerial vehicle's current location or navigation sources. For example, if the aerial vehicle is flying very high frequency omni-directional range (VOR) and Lateral button is armed, the universal avionics control router 205 may engage Lateral control automatically once a VOR signal is captured. The universal avionics control router 205 may determine a condition for engaging, arming, disarming, or disabling a GUI element for automated navigation guidance functions based on data from the aircraft sensors 245 (e.g., a present altitude) or the primary power source 250 (e.g., the present engine power level). In this way, the universal avionics control router 205 dynamically reformats elements within a GUI based upon an operational state of an aerial vehicle The universal avionics control router 205 may have conditions for changing the display state of a GUI element for Vertical control. In one embodiment, the universal avionics control router 205 changes a display state of a button for Vertical control from disarmed to armed in response to determining that Lateral control has been activated. Optionally, in another embodiment, the universal avionics control router 205 changes a display state of a button for Vertical control from disarmed to armed in response to determining that, in addition to Lateral control being activated, at least one down-path flight plan waypoint has an altitude constraint. The universal avionics control router 205 may have different conditions for Vertical control in different maneuvering contexts. For example, Lateral control activation may be a prerequisite for Vertical control as the vehicle is cruising while both (1) automated vehicle control for an approach is activated and (2) a glide slope annunciation refers to both ILS glide slope and GPS Wide Area Augmentation System (WAAS) approach vertical guidance may be prerequisites for Vertical control as the vehicle is also engaged in glide slope automated control (e.g., during an approach). One example of a GUI element for activated automated vehicle control for an approach is depicted in FIG. 5.

The universal avionics control router 205 may generate for display, at a GUI, context cues showing the vehicle operator what guidance will be followed in response to the operator interacting with a GUI element for automated navigation guidance. The universal avionics control router 205 may disable Lateral or Vertical control in response to determining that a flight leg is not available for an en route portion of a flight plan. The universal avionics control router 205 may activate horizontal navigation for an approach in response to an operator selecting a GUI element for activating automated vehicle control for an approach ("Activate Approach"). If the universal avionics control router 205 may continue to follow guidance of an activated Lateral control in response to an operator selecting an Activate Approach GUI element. If Lateral control is active and there is a flight leg with a vertical constraint or glide slope, the universal avionics control router 205 may determine that Vertical control is available to arm and change a display state of a vertical guidance initiation element from disarmed to armed. In some embodiments, the universal avionics control router 205 may prohibit automatic engagement of Vertical control when activating an approach procedure, but rather require operator action to engage in Vertical control.

The universal avionics control router 205 may disarm one or more automated navigation guidance functions (e.g., Lateral or Vertical control) in response to activating an automated vehicle control functions. For example, in response to an operator activating an automated heading bug, the universal avionics control router 205 may disarm Lateral and Vertical control. In another example, in response to an operator activating an automated altitude bug, the universal avionics control router 205 may disarm Vertical control.

The universal avionics control router 205 may generate various pop-up messages for display at the aircraft control interfaces 210. The universal avionics control router 205 may generate a message in response to determining certain conditions are satisfied. The messages can provide context cues to an operator to better understand the automated vehicle control that is or will be occurring. Example message types may include Activate Approach, Retry Approach, Enable Missed, Continue Hold, Exit Hold, or Skip Hold. The universal avionics control router 205 displays an Activate Approach message in response to determining (1) that the next down path approach in the flight plan is preceded by a discontinuity (i.e., a gap in the flight plan) and the aircraft is within a threshold distance (e.g., forty nautical miles (NM)) of the final approach fix (FAF), (2) the next leg of the flight plan is the first leg of a published approach and there is a discontinuity, or (3) that the operator selected Vectors-To-Final arrival.

The universal avionics control router 205 displays a Retry Approach message in response to determining that the presently active leg of the flight plan is part of a published missed approach, and the vehicle is presently conducting a Vectors-To-Final approach. In response to an operator confirming to retry an approach on a Retry Approach message, the universal avionics control router 205 may determine to activate the first leg of the VTF approach (i.e., the leg into the FAF). The universal avionics control router 205 may not display an option to retry the approach in response to determining that the operator is conducting a fully published approach. The universal avionics control router 205 displays an Enable Missed message in response to determining that the next leg of the flight plan is the first leg of a published missed approach (e.g., the determination is made immediately after the FAF). In response to an operator interacting with a GUI element confirming that they missed an approach, the universal avionics control router 205 may activate the published missed approach for that approach if it is in the flight plan. In response to determining that the operator has not interacted with the GUI element prior to reaching the missed approach point (MAP), the universal avionics control router 205 may activate guidance outbound from the MAP using the same course as the final approach course.

The universal avionics control router 205 displays a Continue Hold message in response to determining that the active leg of the flight plan is a hold and is not the last leg of the route. In response to an operator interacting with a GUI element to confirm that they want to continue flying a hold, the universal avionics control router 205 will cause the aerial vehicle to continue the hold if the vehicle was exiting the hold. The universal avionics control router 205 displays an Exit Hold message in response to determining that the active leg of the flight plan is a hold and is not the last leg of the route. In response to an operator interacting with a GUI element to confirm that they want to exit flying a hold, the universal avionics control router 205 will cause the aerial vehicle to exit the hold. The universal avionics control router 205 displays a Skip Hold message in response to determining that the aircraft is within 5 NM of the FAF and the next leg is a procedure hold. In response to an operator interacting with a GUI element to skip flying a hold, the universal avionics control router 205 will cause the aerial vehicle to sequence the active leg past the hold without entering it when the vehicle reaches the FAF. The universal avionics control router 205 causes the leg after the hold to become active.

The universal avionics control router 205 may generate an informational header for display that includes information related to the actions of the automated vehicle control (e.g., the next waypoint, arrival at the top of descent (TOD), bearing, and distance to the next waypoint). This information provides operators with added situational awareness to understand navigational maneuvers that the universal avionics control router 205 is executing. Some events that the informational header may capture for display to an operator include entering a hold pattern at a particular waypoint, exiting a hold at a fix, arriving at a waypoint, intercepting a particular path at a certain angle, final approach fix to runway, missed approach, primary navigation source mode transitions, or auto NAV frequency updates.

The universal avionics control router 205 may maintain an operator input hierarchy. The operator input hierarchy may be a predefined hierarchy of control inputs used to determine when to override a previously provided input. For example, there may be a hierarchy of control among a first control input from the control stick and a second control input from the automated vehicle control functions. The control stick inputs may override the decisions made by the universal avionics control router 205 as a part of the automated vehicle control functions. The pilot input may be hierarchical within each axis. For example, if an operator provides an input on a particular axis of control, the universal avionics control router 205 may overwrite latent automated vehicle control commands made on the same axis. In another example, if an altitude is preselected and used to automatically control the vehicle in a climb, the operator can simply roll a Vertical Thumb Lever (VTL) that controls vertical speed to take direct control and deactivate the previously preselected altitude.

In some embodiments, the universal avionics control router 205 may apply a hierarchy of control inputs to determine to override at least one of multiple inputs received within a threshold time window of each other. The universal avionics control router 205 can receive a first operator interaction with a GUI generated by the digital interface generator 260 at a touch screen. The universal avionics control router 205 can receive a second operator interaction with the GUI at a control stick of the aerial vehicle, where the first operator interaction and the second operator interaction are received within a predefined time window. The universal avionics control router 205 determine, based on a hierarchy of control inputs, to override one of the first operator interaction or second operator interaction.

The aerial vehicle control interfaces 210 may include a touch control disconnect (TCD) interactable element (e.g., a button) that, in response to an operator interacting with the TCD element, causes the universal avionics control router 205 to disengage certain commands (e.g., automated vehicle control functions or automated navigation guidance). The universal avionics control router 205 may disengage the commands in response to determining that the operator has held the TCD element within a threshold time (e.g., two seconds or less). In some embodiments, the universal avionics control router 205 may disengage all automated vehicle control commands. As an alternative to complete disengagement, the universal avionics control router 205 may adjust the automated vehicle control commands to a predefined state (e.g., maintain automated control of the current speed, heading, and altitude, but return lateral trim or vertical rate control to the control stick).

The universal avionics control router 205 may both disengage the currently active automated vehicle control commands and prevent subsequent non-emergency automated vehicle control commands in response to determining that the operator has held the TCD element for a threshold time (e.g., greater than two seconds). In some embodiments, the universal avionics control router 205 cause the automated vehicle control commands to be re-enabled in response to determining that the operator has performed another hold of the TCD element for the threshold time and confirmed the action on a second interface (e.g., a touchscreen interface).

The universal avionics control router 205 is configured to convert the inputs received from the aerial vehicle control interfaces 210 into instructions to an actuator 215 configured to move an aerial vehicle component. The universal avionics control router 205 includes flight control computers 220. Each flight control computer 220 includes control modules 225A, 225B, 225C (collectively 225), a FAT voter 230A, 230B, 230C (collectively 230), and one or more processors (not shown). Each flight control computer 220 is associated with a backup power source 235A, 235B, 235C (collectively 235) configured to provide power to the associated flight control computer 220. In the illustrated embodiment, the universal avionics flight control router 205 includes three flight control computers 220. However, in other embodiments, the universal avionics control router 205 may include two, four, five, or any other suitable number of flight control computers 220.

Each flight control computer 220 is configured to receive inputs from the aerial vehicle control interfaces 210 and provide instructions to actuators 215 configured to move aerial vehicle components in a redundant configuration. Each flight control computer 220 operates in an independent channel from the other flight control computer 220. Each independent channel comprises distinct dedicated components, such as wiring, cabling, servo motors, etc., that is separate from the components of the other independent channels. The independent channel includes the plurality of motors 240 to which the flight control computer provides commands. One or more components of each flight control computer 220 may be manufactured by a different manufacturer, be a different model, or some combination thereof, to prevent a design instability from being replicated across flight control computers 220. For example, in the event that a chip in a processor is susceptible to failure in response to a particular sequence of inputs, having different chips in the processors of the other flight control computers 220 may prevent simultaneous failure of all flight control computers in response to encountering that particular sequence of inputs.

Each flight control computer 220 comprises a plurality of control modules 225 configured to convert inputs from the aerial vehicle control interfaces 210 and aerial vehicle sensors 245 into actuator instructions. The control modules may comprise an automated aerial vehicle control module, an aerial vehicle state estimation module, a sensor validation module, a command processing module, and a control laws module. The automated aerial vehicle control module may be configured to generate a set of universal aerial vehicle control inputs suitable for executing automated control processes. The automated aerial vehicle control module can be configured to determine that an aerial vehicle is ready for flight. The automated aerial vehicle control module may receive measurements taken by the aerial vehicle sensors 245, determine measurements derived therefrom, of a combination thereof. For example, the automated aerial vehicle control module may receive an N1 measurement from a tachometer of the aerial vehicle sensors 245 indicating a rotational speed of a low pressure engine spool, determine a percent RPM based on an engine manufacturer's predefined rotational speed that corresponds to a maximum rotational speed or 100%, or a combination thereof.

The automated aerial vehicle control module may further be configured to automate the startup of one or more engines of the aerial vehicle. The automated aerial vehicle control module may perform tests during engine startup, which can include multiple stages (e.g., before starting the engine, or "pre-start," and after starting the engine, or "post-start"). The automated aerial vehicle control module can use measurements taken by sensors of the aerial vehicle (e.g., the vehicle sensors 140) to verify whether one or more of safety criteria or accuracy criteria are met before authorizing the operator to fly the aerial vehicle. The sensor measurements may characterize properties of the engine such as oil temperature, oil pressure, rotational speeds (e.g., N1 or N2), any suitable measurement of an engine's behavior, or combination thereof. For example, the automated aerial vehicle control module may enable the user to increase the engine speed and raise the collective of a helicopter in response to determining that both a first set of safety criteria are met by engine measurements taken before starting the engine, or "pre-start engine parameters," and a second set of safety criteria are met by engine measurements taken after starting the engine and before takeoff, or "post-start engine parameters." As referred to herein, a safety criterion may be a condition to be met by a pre-start or post-start engine parameter to determine that one or more actuators of the aerial vehicle are safe to operate. Examples of safety criteria include the engagement of seat belts, a clear area around an aerial vehicle preparing to take off, a target oil pressure or temperature achieved during engine startup, etc. The automated aerial vehicle control module may implement various accuracy and redundancy checks to increase the safety of the automated engine startup. Although the term "automated engine startup" is used herein, the engine startup process may be fully automated or partially automated (e.g., assisted engine startup).

The aerial vehicle state estimation module may be configured to determine an estimated aerial vehicle state of the aerial vehicle using validated sensor signals, such as an estimated 3D position of the vehicle with respect to the center of the Earth, estimated 3D velocities of the aerial vehicle with respect to the ground or with respect to a moving air mass, an estimated 3D orientation of the aerial vehicle, estimated 3D angular rates of change of the aerial vehicle, an estimated altitude of the aerial vehicle, or any other suitable information describing a current state of the aerial vehicle.

The sensor validation module is configured to validate sensor signals captured by the aerial vehicle sensors 245. For example, the sensors may be embodiments of the vehicle sensors 140 described above with reference to FIG. 1. Outputs of the sensor validation module may be used by the automated aerial vehicle control module to verify that the aerial vehicle is ready for operation.

The command processing module is configured to generate aerial vehicle trajectory values using the universal aerial vehicle control inputs. The trajectory values may also be referred to herein as navigation or navigation values. The aerial vehicle trajectory values describe universal rates of change of the aerial vehicle along movement axes of the aerial vehicle in one or more dimensions. The command processing module may be configured to modify non-navigational operation of the aerial vehicle using the universal aerial vehicle control inputs. Non-navigational operation is an operation of the aerial vehicle that does not involve actuators that control the movement of the aerial vehicle. Examples of non-navigational operation includes a temperature inside the cabin, lights within the cabin, a position of an electronic display within the cabin, audio output (e.g., speakers) of the aerial vehicle, one or more radios of the aerial vehicle (e.g., very-high-frequency radios for identifying and communication with ground stations for navigational guidance information), any suitable operation of the aerial vehicle that operates independently of the aerial vehicle's movement, or a combination thereof. The universal aerial vehicle control inputs may be received through GUIs generated by the digital interface generator 260. Control inputs may include finger gestures as applied to a touchscreen displaying a GUI generated by the digital interface generator 260.

The control laws module is configured to generate the actuator commands (or signals) using the aerial vehicle position values. The control laws module includes an outer processing loop and an inner processing loop. The outer processing loop applies a set of control laws to the received aerial vehicle position values to convert aerial vehicle position values to corresponding allowable aerial vehicle position values. Conversely, the inner processing loop converts the allowable aerial vehicle position values to the actuator commands configured to operate the aerial vehicle to achieve the allowable aerial vehicle position values. Both the outer processing loop and the inner processing loop are configured to operate independently of the particular aerial vehicle including the universal avionics control router 205. In order to operate independently in this manner, the inner and outer processing loops may use a model including parameters describing characteristics of the aerial vehicle that can be used as input to processes or steps of the outer and inner processing loops. The control laws module may use the actuator commands to directly control corresponding actuators, or may provide the actuator commands to one or more other components of the aerial vehicle to be used to operate the corresponding actuators.

The FAT voters 230 are configured to work together to determine which channels should be prevented from controlling the downstream functions, such as control of an actuator 215. Each FAT voter 230 comprises a channel enable logic configured to determine whether that channel should remain active. In response to a FAT voter 230 determining that its associated flight control computer 220 is malfunctioning during a self-assessment routine, the FAT voter 230 may disconnect the flight control computer 220 from the motors 240 in its channel, thus disconnecting the flight control computer 220 from all actuators 215. The self-assessment is performed in the processor of the flight control computer 220 based on high assurance software. The self-assessment routine assumes that the processor is in good working order. Each flight control computer 220 evaluates the signal output by the other channels to determine whether the other channels should be deactivated. Each flight control computer 220 compares the other flight control computers' 220 control commands to the downstream functions as well as other signals contained in the cross-channel data link to its own. Each flight control computer 220 may be connected to the other flight control computers 220 via a cross-channel data link. The flight control computer 220 executes a failure detection algorithm to determine the sanity of the other flight control computers 220. In response to other flight control computers 220 determining that a flight control computer 220 is malfunctioning, the FAT voter 230 for the malfunctioning flight control computer 220 may disconnect the malfunctioning flight control computer 220 from the motors 240 in its channel. In some embodiments, the FAT voter 230 may disconnect power to the malfunctioning flight control computer 220.

The backup power sources 235 are configured to provide power to the flight control computers 220 and motors 240 in the event of a disruption of power from a primary power source 250. The backup power source 235 may comprise a battery, an auxiliary generator, a flywheel, an ultra-cap, some other power source, or some combination thereof. The backup power source 235 may be rechargeable, but can alternately be a single use, and/or have any suitable cell chemistry (e.g., Li-ion, Ni-cadmium, lead-acid, alkaline, etc.). The backup power source is sufficiently sized to concurrently power all flight components necessary to provide aerial vehicle control authority and or sustain flight (e.g., alone or in conjunction with other backup power sources). The backup power source 235 may be sized to have sufficient energy capacity to enable a controlled landing, power the aerial vehicle for a at least a predetermined time period (e.g., 10 minutes, 20 minutes, 30 minutes, etc.), or some combination thereof. In some embodiments, the backup power source 235 can power the flight control computer 220, aerial vehicle sensors 245, and the motors 240 for the predetermined time period.

The backup power sources 235 can include any suitable connections. In some embodiments, each backup power source 235 may supply power to a single channel. In some embodiments, power can be supplied by a backup power source 235 over multiple channels, shared power connection with other backup power systems 235, and/or otherwise suitably connected. In some embodiments, the backup power sources 235 can be connected in series between the primary power source 250 and the flight control computer 220. In some embodiments, the backup power source 235 can be connected to the primary power source 250 during normal operation and selectively connected to the flight control computer 220 during satisfaction of a power failure condition. In some embodiments, the backup power source 235 can be connected in parallel with the primary power source 250. However, the backup power source can be otherwise suitably connected.

The backup power sources 235 may be maintained at substantially full state of charge (SoC) during normal flight (e.g., 100% SoC, SoC above a predetermined threshold charge), however can be otherwise suitably operated. In some embodiments, the backup power sources 235 draw power from the primary power source 250 during normal flight, may be pre-charged (or installed with a full charge) before flight initiation, or some combination thereof. The backup power sources 235 may employ load balancing to maintain a uniform charge distribution between backup power sources 235, which may maximize a duration of sustained, redundant power. Load balancing may occur during normal operation (e.g., before satisfaction of a power failure condition), such as while the batteries are drawing power from the primary power source 250, during discharge, or some combination thereof.

Backup power may be employed in response to satisfaction of a power failure condition. A power failure condition may include: failure to power the actuator from aerial vehicle power (e.g., main power source, secondary backup systems such as ram air turbines, etc.), electrical failure (e.g., electrical disconnection of UACR from primary power bus, power cable failure, blowing a fuse, etc.), primary power source 250 (e.g., generator, alternator, engine, etc.) failure, power connection failure to one or more flight components (e.g., actuators, processors, drivers, sensors, batteries, etc.), fuel depletion below a threshold (e.g., fuel level is substantially zero), some other suitable power failure condition, or some combination thereof. In some embodiments, a power failure condition can be satisfied by a manual input (e.g., indicating desired use of backup power, indicating a power failure or other electrical issue).

The motors 240A, 240B, 240C (collectively 240) are configured to move an actuator 215 to modify the position of an aerial vehicle component. Motors 240 may include rotary actuators (e.g., motor, servo, etc.), linear actuators (e.g., solenoids, solenoid valves, etc.), hydraulic actuators, pneumatic actuators, any other suitable motors, or some combination thereof. In some embodiments, an actuator 215 may comprise one motor 240 and associated electronics in each channel corresponding to each flight control computer 220. For example, the illustrated actuator 215 comprises three motors 240, each motor 240 associated with a respective flight control computer 220. In some embodiments, an actuator 215 may comprise a single motor 240 that comprises an input signal from each channel corresponding to each flight control computer 220. Each flight control computer 220 may be capable of controlling all actuators 215 by controlling all motors 240 within that channel.

The actuators 215 may be configured to manipulate control surfaces to affect aerodynamic forces on the aerial vehicle to execute flight control. The actuators 215 may be configured to replace manual control to components, include the power-plant, flaps, brakes, etc. In some embodiments, actuators 215 may comprise electromagnetic actuators (EMAs), hydraulic actuators, pneumatic actuators, any other suitable actuators, or some combination thereof. Actuators 215 may directly or indirectly manipulate control surfaces. Control surfaces may include rotary control surfaces (e.g., rotor blades), linear control surfaces, wing flaps, elevators, rudders, ailerons, any other suitable control surfaces, or some combination thereof. In some embodiments, actuators 215 can manipulate a swashplate (or linkages therein), blade pitch angle, rotor cyclic, elevator position, rudder position, aileron position, tail rotor RPM, any other suitable parameters, or some combination thereof. In some embodiments, actuators 215 may include devices configured to power primary rotor actuation about the rotor axis (e.g., in a helicopter).

The motors 240 may be electrically connected to any suitable number of backup power sources via the harness. The motors 240 can be connected to a single backup power source, subset of backup power sources, and/or each backup power source. In normal operation, each motor 240 in each channel may be powered by the flight control computer 220 in that channel. The motors 240 may be wired in any suitable combination/permutation of series/parallel to each unique power source in each channel. The motors 240 may be indirectly electrically connected to the primary power source 250 via the backup power source (e.g., with the backup power source connected in series between the motor 240 and primary power source 250), but can alternatively be directly electrically connected to the primary power source 250 (e.g., separate from, or the same as, that powering the backup power source). The flight control computer 220 in each channel independently powers and provides signals to each channel.

The various components may be connected by a harness, which functions to electrically connect various endpoints (e.g., modules, actuators, primary power sources, human machine interface, external sensors, etc.) on the aerial vehicle. The harness may include any suitable number of connections between any suitable endpoints. The harness may include a single (electrical) connector between the harness and each module, a plurality of connectors between each harness and each module, or some combination thereof. In some embodiments, the harness includes a primary power (e.g., power in) and a flight actuator connection (e.g., power out) to each module. In some embodiments, the harness can include separate power and data connections, but these can alternately be shared (e.g., common cable/connector) between various endpoints. The harness may comprise intermodule connections between each module and a remainder of the modules.

The harness may comprise intra-module electrical infrastructure (e.g., within the housing), inter-module connections, connections between modules and sensors (e.g., magnetometers, external air data sensors, GPS antenna, etc.), connections between modules and the human machine interface, and/or any other suitable connections. Intra-module connections can, in variants, have fewer protections (e.g., EMI protections, environmental, etc.) because they are contained within the housing. In variants, inter-module connections can enable voting between processors, sensor fusion, load balancing between backup power sources, and/or any other suitable power/data transfer between modules. In variants retrofitting an existing aerial vehicle and/or installed after-market, the harness can integrate with and/or operate in conjunction with (e.g., use a portion of) the existing aerial vehicle harness.

Example Vehicle Control Interfaces

Figure 3:
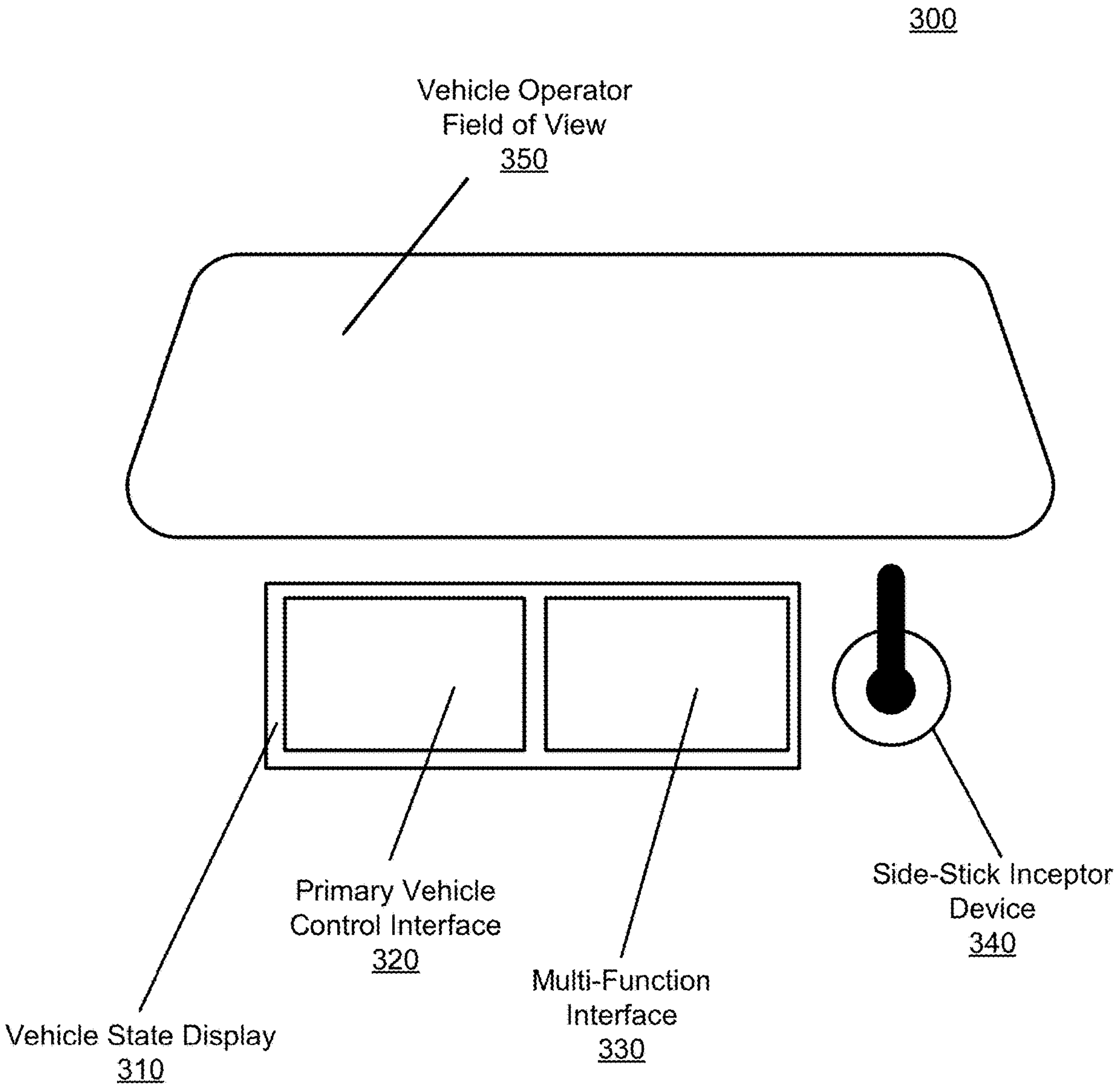
FIG. 3 illustrates a configuration for a set of universal vehicle control interfaces in a vehicle, in accordance with one or more embodiments.

FIG. 3 illustrates a configuration 300 for a set of universal vehicle control interfaces in a vehicle, in accordance with one embodiment. The vehicle control interfaces in the configuration 300 may be embodiments of the universal vehicle control interfaces 110, as described above with reference to FIG. 1. In the embodiment shown, the configuration 300 includes a vehicle state display 310, a mechanical controller 340, and a vehicle operator field of view 350. In other embodiments, the configuration 300 may include different or additional elements. Furthermore, the functionality may be distributed among the elements in a different manner than described.

The vehicle state display 310 is one or more electronic displays (e.g., liquid-crystal displays (LCDs) configured to display or receive information describing a state of the vehicle including the configuration 300. In particular, the vehicle state display 310 may display various interfaces including feedback information for an operator of the vehicle. In this case, the vehicle state display 310 may provide feedback information to the operator in the form of virtual maps, 3D terrain visualizations (e.g., wireframe, rendering, environment skin, etc.), traffic, weather, engine status, communication data (e.g., air traffic control (ATC) communication), guidance information (e.g., guidance parameters, trajectory), and any other pertinent information.

Additionally, or alternatively, the vehicle state display 310 may display various interfaces for configuring or executing automated vehicle control processes, such as automated aerial vehicle landing or takeoff or navigation to a target location. The vehicle state display 310 may receive user inputs via various mechanisms, such as gesture inputs (as described above with reference to the interface 320), audio inputs, or any other suitable input mechanism.

As depicted in FIG. 3 the vehicle state display 310 includes a primary vehicle control interface 320 and a multi-function interface 330. The primary vehicle control interface 320 is configured to facilitate short-term of the vehicle including the configuration 300. In particular, the primary vehicle control interface 320 includes information immediately relevant to control of the vehicle, such as current universal control input values or a current state of the vehicle (e.g., primary flight data such as aircraft communication, navigation, identification, etc.). As an example, the primary vehicle control interface 320 may include a virtual object representing the vehicle in 3D or 2D space. In this case, the primary vehicle control interface 320 may adjust the display of the virtual object responsive to operations performed by the vehicle in order to provide an operator of the vehicle with visual feedback. The primary vehicle control interface 320 may additionally, or alternatively, receive universal vehicle control inputs via gesture inputs.

The multi-function interface 330 is configured to facilitate long-term control of the vehicle including the configuration 300. In particular, the primary vehicle control interface 320 may include information describing a mission for the vehicle (e.g., navigation to a target destination) or information describing the vehicle systems. Information describing the mission may include routing information, mapping information, or other suitable information. Information describing the vehicle systems may include engine health status, engine power utilization, fuel, lights, vehicle environment, or other suitable information. In some embodiments, the multi-function interface 330 or other interfaces enable mission planning for operation of a vehicle. For example, the multi-function interface 330 may enable configuring missions for navigating a vehicle from a start location to a target location. In some cases, the multi-function interface 330 or another interface provides access to a marketplace of applications and services. The multi-function interface 330 may also include a map, a radio tuner, or a variety of other controls and system functions for the vehicle.

In some embodiments, the vehicle state display 310 includes information describing a current state of the vehicle relative to one or more control limits of the vehicle (e.g., on the primary vehicle control interface 320 or the multi-function interface 330). For example, the information may describe power limits of the vehicle or include information indicating how much control authority a use has across each axis of movement for the vehicle (e.g., available speed, turning ability, climb or descent ability for an aerial vehicle, etc.). In the same or different example embodiment, the vehicle state display 310 may display different information depending on a level of experience of a human operator of the vehicle. For instance, if the vehicle is an aerial vehicle and the human operator is new to flying, the vehicle state display may include information indicating a difficulty rating for available flight paths (e.g., beginner, intermediate, or expert). The particular experience level determined for an operator may be based upon prior data collected and analyzed about the human operator corresponding to their prior experiences in flying with flight paths having similar expected parameters. Additionally, or alternatively, flight path difficulty ratings for available flight paths provided to the human operator may be determined based on various information, for example, expected traffic, terrain fluctuations, airspace traffic and traffic type, how many airspaces and air traffic controllers along the way, or various other factors or variables that are projected for a particular flight path. Moreover, the data collected from execution of this flight path can be fed back into the database and applied to a machine learning model to generate additional and/or refined ratings data for the operator for subsequent application to other flight paths. Vehicle operations may further be filtered according to which one is the fastest, the most fuel efficient, or the most scenic, etc.

The one or more vehicle state displays 310 may include one or more electronic displays (e.g., liquid-crystal displays (LCDs), organic light emitting diodes (OLED), plasma). For example, the vehicle state display 310 may include a first electronic display for the primary vehicle control interface 320 and a second electronic display for the multi-function interface 330. In cases where the vehicle state display 310 include multiple electronic displays, the vehicle state display 310 may be configured to adjust interfaces displayed using the multiple electronic displays, e.g., in response to failure of one of the electronic displays. For example, if an electronic display rendering the primary vehicle control interface 320 fails, the vehicle state display 310 may display some or all of the primary vehicle control interface 320 on another electronic display.

The one or more electronic displays of the vehicle state display 310 may be touch sensitive displays is configured to receive touch inputs from an operator of the vehicle including the configuration 300, such as a multi-touch display. For instance, the primary vehicle control interface 320 may be a gesture interface configured to receive universal vehicle control inputs for controlling the vehicle including the configuration 300 via touch gesture inputs. In some cases, the one or more electronic displays may receive inputs via other type of gestures, such as gestures received via an optical mouse, roller wheel, three-dimensional (3D) mouse, motion tracking device (e.g., optical tracking), or any other suitable device for receiving gesture inputs.

Touch gesture inputs received by one or more electronic displays of the vehicle state display 310 may include single finger gestures (e.g., executing a predetermined pattern, swipe, slide, etc.), multi-finger gestures (e.g., 2, 3, 4, 5 fingers, but also palm, multi-hand, including/excluding thumb, etc.; same or different motion as single finger gestures), pattern gestures (e.g., circle, twist, convergence, divergence, multi-finger bifurcating swipe, etc.), or any other suitable gesture inputs. Gesture inputs can be limited asynchronous inputs (e.g., single input at a time) or can allow for multiple concurrent or synchronous inputs. In variants, gesture input axes can be fully decoupled or independent. In a specific example, requesting a speed change holds other universal vehicle control input parameters fixed—where vehicle control can be automatically adjusted in order to implement the speed change while holding heading and vertical rate fixed. Alternatively, gesture axes can include one or more mutual dependencies with other control axes. Unlike conventional vehicle control systems, such as aerial vehicle control systems, the gesture input configuration as disclosed provides for more intuitive user experiences with respect to an interface to control vehicle movement.

In some embodiments, the vehicle control interface 320 or other interfaces are configured to adjust in response to vehicle operation events, such as emergency conditions. For instance, in response to determining the vehicle is in an emergency condition, the vehicle control and interface system 100 may adjust the vehicle state display 310 to include essential information or remove irrelevant information. As an example, if the vehicle is an aerial vehicle and the vehicle control and interface system 100 detects an engine failure for the aerial vehicle, the vehicle control and interface system 100 may display essential information on the vehicle state display 310 including 1) a direction of the wind, 2) an available glide range for the aerial vehicle (e.g., a distance that the aerial vehicle can glide given current conditions), or 3) available emergency landing spots within the glide range. The vehicle control and interface system 100 may identify emergency landing locations using various processes, such as by accessing a database of landing spots (e.g., included in the data store 150 or a remote database) or ranking landing spots according to their suitability for an emergency landing.

The mechanical controller 340 may be configured to receive universal vehicle control inputs. In particular, the mechanical controller 340 may be configured to receive the same or similar universal vehicle control inputs as a gesture interface of the vehicle state display 310 is configured to receive. In this case, the gesture interface and the mechanical controller 340 may provide redundant or semi-redundant interfaces to a human operator for providing universal vehicle control inputs. The mechanical controller 340 may be active or passive. Additionally, the mechanical controller 340 and may include force feedback mechanisms along any suitable axis. For instance, the mechanical controller 340 may be a 4-axis controller (e.g., with a thumbwheel).

The components of the configuration 300 may be integrated with the vehicle including the configuration 300 using various mechanical or electrical components. These components may enable adjustment of one or more interfaces of the configuration 300 for operation by a human operator of the vehicle. For example, these components may enable rotation or translation of the multi-function interface 330 toward or away from a position of the human operator (e.g., a seat where the human operator sits). Such adjustment may be intended, for example, to prevent the interfaces of the configuration 300 from obscuring a line of sight of the human operator to the vehicle operator field of view 350.

The vehicle operator field of view 350 is a first-person field of view of the human operator of the vehicle including the configuration 300. For example, the vehicle operator field of view 350 may be a windshield of the vehicle or other suitable device for enabling a first-person view for a human operator.

The configuration 300 additionally or alternately include other auxiliary feedback mechanisms, which can be auditory (e.g., alarms, buzzers, etc.), haptic (e.g., shakers, haptic alert mechanisms, etc.), visual (e.g., lights, display cues, etc.), or any other suitable feedback components. Furthermore, displays of the configuration 300 (e.g., the vehicle state display 310) can simultaneously or asynchronously function as one or more of different types of interfaces, such as an interface for receiving vehicle control inputs, an interface for displaying navigation information, an interface for providing alerts or notifications to an operator of the vehicle, or any other suitable vehicle instrumentation. Furthermore, portions of the information can be shared between multiple displays or configurable between multiple displays.

A benefit of the configuration 300 is to minimize the intricacies of vehicle operation that an operator would handle in a conventional vehicle control system. The mechanical controller described herein contributes to this benefit by providing vehicle movement controls through fewer user inputs than a conventional vehicle control system. For example, an aerial vehicle may have a hand-operated control stick for controlling the elevator and aileron, foot-operated pedals for controlling the rudder, buttons for controlling throttle, propeller, and other controls throughout the cockpit of the aerial vehicle. In one embodiment, the mechanical controller described herein may be operated using a single hand of the operator to control the speed and direction of the aerial vehicle. For example, the operator may move the mechanical controller about the lateral, longitudinal, and directional axes corresponding to instructions for operating the elevator, aileron, and rudder of the aerial vehicle to control direction. Further, the operator may use the thumb of their hand already holding the mechanical controller to control a fourth-axis input of the mechanical controller and control speed of the aerial vehicle. For example, the operator spins a thumbwheel on the mechanical controller to increase or decrease the speed of the aerial vehicle. In at least this way, the configuration 300 and the mechanical controller described herein can reduce the cognitive load demanded of a vehicle operator.

Example Engine Startup Using the Vehicle Control and Interface System

Figure 6:
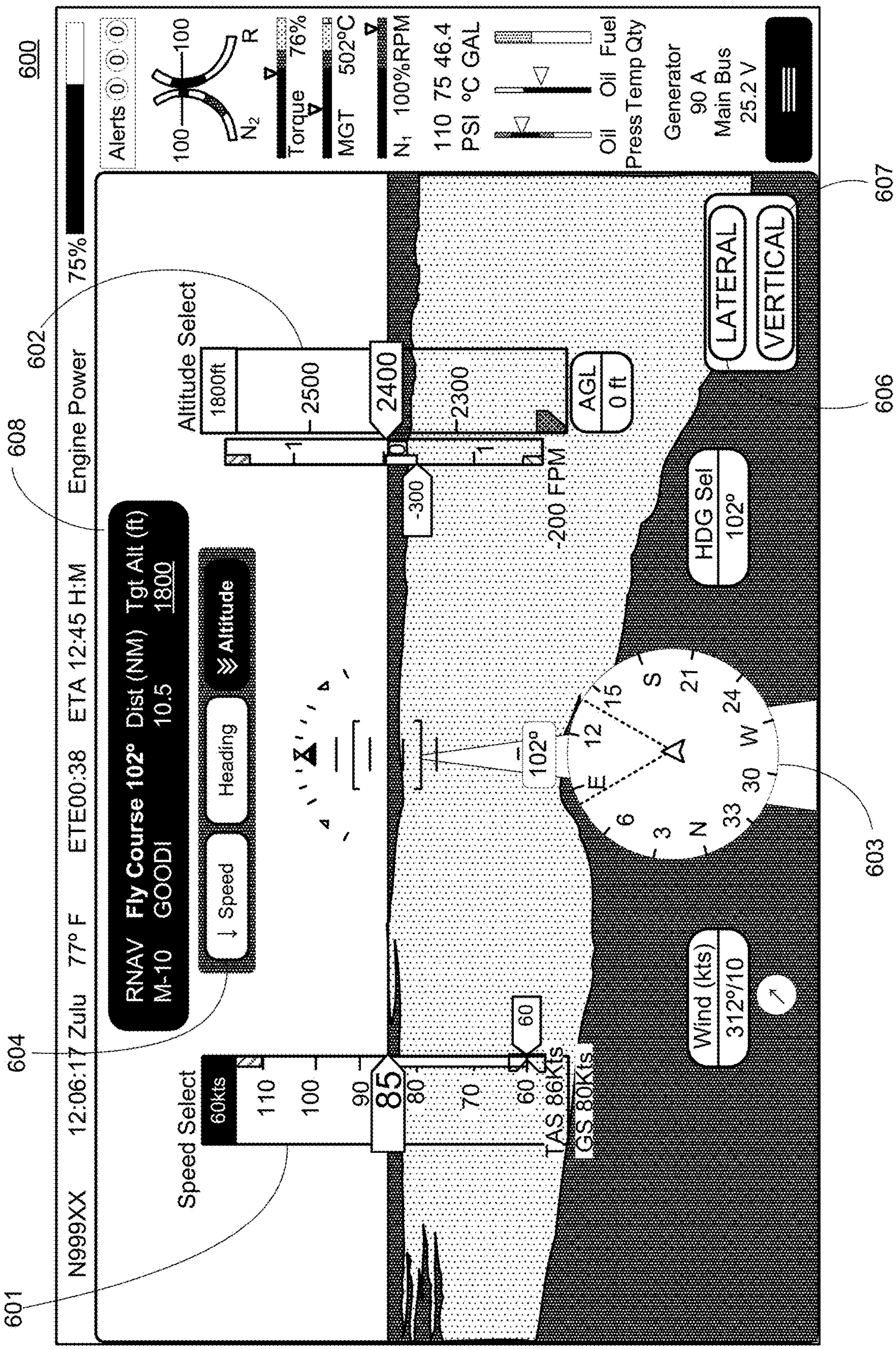
FIG. 6 shows a GUI for activating approach, in accordance with one embodiment.
Figure 7:
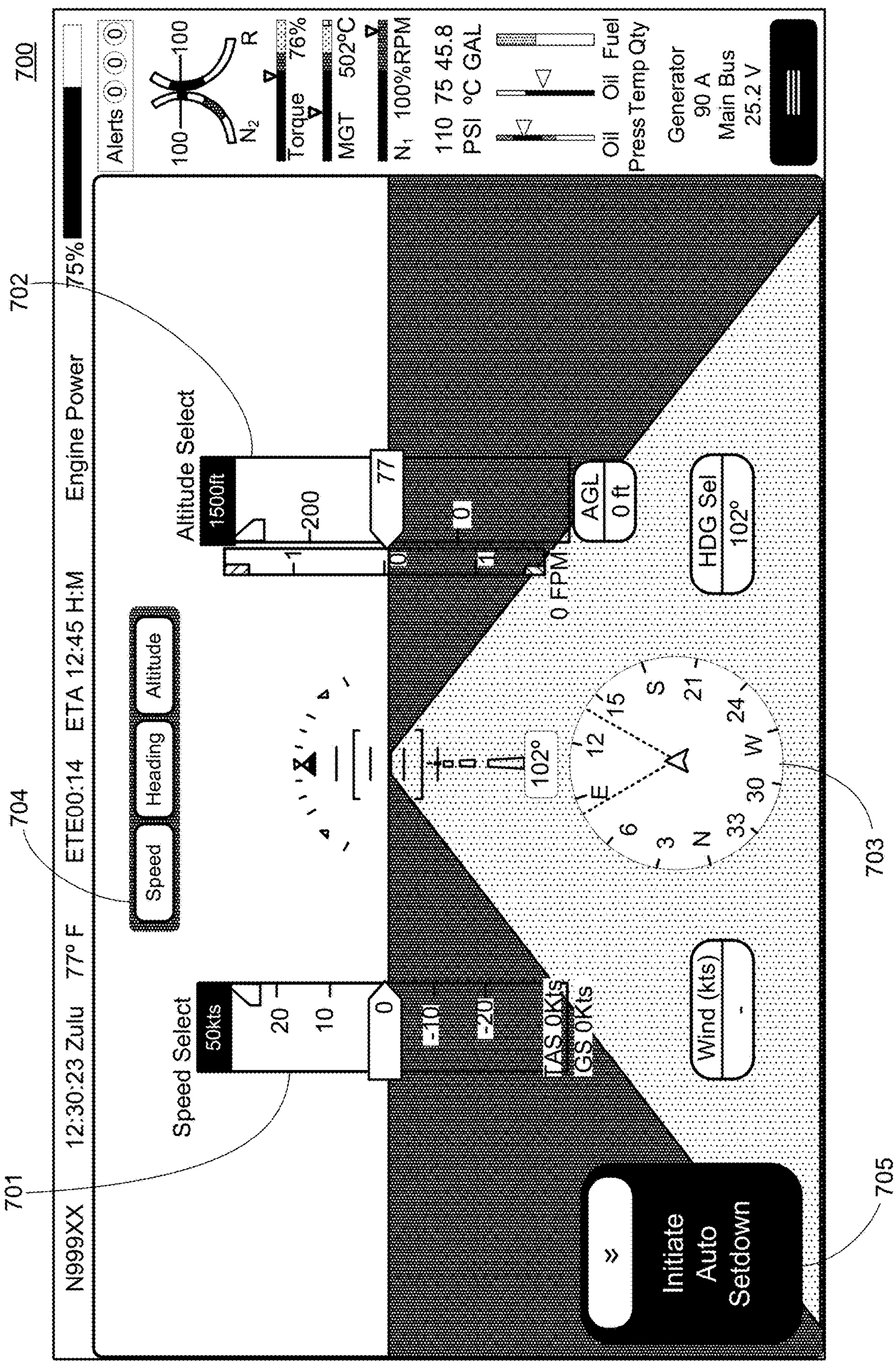
FIG. 7 shows a GUI for initiating setdown, in accordance with one embodiment.

Referring now to FIGS. 4-7, various example interfaces and methods for automating aerial vehicle control are described. A vehicle control and interface system may fully or partially automate a process for operating or navigating an aerial vehicle. This process may include an auto pickup, which refers to a process for bringing an aerial vehicle from the ground to a hovering position. FIG. 4 shows an example interface for automating pickup. This process may include activating an approach, which refers to a process for preparing an aerial vehicle for approach and executing the approach. FIG. 5 shows an example interface for initiating approach activation. FIG. 6 shows an example interface of an aerial vehicle as approach is activated. The process may include an auto setdown, which refers to a process for bringing an aerial vehicle from a hovering position down to the ground. FIG. 7 shows an example interface for initiating setdown. The example interfaces shown in FIGS. 4-7 may appear chronologically in that order (e.g., from pickup to setdown). The GUIs in FIGS. 4-7 may be generated by the digital interface generator 260 of the universal avionics control router 205 for display on one of the aircraft control interfaces 210 (e.g., a touchscreen).

The interfaces shown in FIGS. 4-7 are non-limiting examples of interfaces for depicting information and user control inputs related to automated vehicle control. In different embodiments, different configurations of user interface elements (e.g., using dials instead of tapes to depict aerial vehicle vertical speed) or different GUIs (e.g., to present different information) may be generated by the vehicle control and interface system 100. The aerial vehicle in which the interfaces shown in FIGS. 4-7 are located may include additional interfaces for controlling the same operational parameters (e.g., a control stick for setting an altitude).

FIG. 4 shows a GUI 400 for automating pickup, in accordance with one embodiment. The GUI 400 includes a navigation visualization window 410 displaying the environment outside of the aerial vehicle within the operator's front-facing view. The window 410 displays a runway of an airport as the aerial vehicle is stationary on the ground. Although the interfaces in FIGS. 4-7 are depicted as having a navigational visualization window and a sidebar to the right of the navigational visualization window displaying additional parameters regarding the aerial vehicle's operation (e.g., fuel quantity, an N1 indicator, and alerts), an interface may have a different arrangement (e.g., vertically stacked with one window above another rather than side-by-side as depicted in FIGS. 4-7) or a different number of windows. For example, an interface may have a navigational visualization window with a sidebar to its right and a map to its left, where the map displays a top down view of the aerial vehicle's surroundings and where the aerial vehicle is located. Additionally, while the sidebar depicted in FIGS. 4-7 to the right of the navigational visualization window displays statistics of a number of alerts (e.g., a fuel quantity alert, engine failure alerts, etc.), the interface may additionally or alternatively display text of the alerts themselves (e.g., "Low Fuel," "Generator Failure," etc.).

A speed tape 401 and an altitude tape 402 reflect the vehicle's stationary state (i.e., the current speed being zero knots (kts) and the current altitude being zero feet (ft)). The operator may set a speed bug or altitude bug by sliding their finger along the speed tape 401 or the altitude tape 402, respectively, via a touchscreen. For example, the operator may first contact the present heading indicator 411 and slide their finger upwards to cause the GUI to update the speed tape 401 such that larger values are displayed (e.g., 10 kts, 20 kts, and higher). The operator may similarly adjust the present altitude by contacting the present altitude indicator 412 and sliding their finger upwards to cause the GUI to update the altitude tape 402 to display larger values. The heading wheel 403 reflects the current heading of the aerial vehicle, which is at seventy-nine degrees. An automated vehicle control header 404 displays buttons for initiating automated control and presents a visual indicator of the result once the button is selected. By displaying the results of interacting with the header 404, the header 404 gives an operator more operational awareness of what the vehicle will be automatically doing.

An operator may set target values or "bugs" by swiping a finger on the speed tape 401 or the altitude tape 402 on a touchscreen. The heading bug can be set by touching and moving the heading wheel 403 around the Heading Situation Indicator (HSI) 413. The bugs may also be set through a number keypad (either physical or digitally generated) by entering the desired values for speed, altitude, and heading. These target values may be synchronized with the display interface on which the GUI 400 is displayed and the displayed values of the bugs on the GUI 400 are automatically updated. An operator can activate a bug on the display interface for speed, heading and altitude independent of each other. Once activated, the vehicle control and interface system 100 can automatically guide the aerial vehicle to achieve the targeted value. While activated, the automated vehicle control can be deactivated by: (1) touch controls on the display interface, (2) deflecting the control stick (e.g., on an axis-by-axis basis), or (3) a short or long press and release of a TCD element.

An operator's interaction with the speed tape 401 may increase the targeted speed (i.e., speed bug) with an upward swipe movement and decrease the targeted speed with a downward swipe movement. Once the speed bug is set, it can be activated by tapping the "Speed" button on the automated vehicle control header 404. The aerial vehicle can seek the activated speed at a default standard rate. The "Speed" button on the header 404 can present dynamic information such as an up or down arrow, indicating if the indicated airspeed (IAS) will increase or decrease upon activation. Once the target speed is achieved, this automated control function is considered complete, and the speed bug may deactivate. The vehicle control and interface system 100 may hold the IAS after capture until a new input speed command is executed. During the execution of the automated speed adjustment, if the vehicle control and interface system 100 receives an input command from the control stick, the vehicle control and interface system 100 may deactivate the speed adjustment and revert to the input from the control stick according to a predefined input control hierarchy.

An operator may set a heading bug through the heading wheel 403 and the HSI 413. The heading wheel 403 may be operator interactable with a rotating gesture to engage the aerial vehicle at a target heading, where the rotating gesture includes one or more fingers moving in a circle (e.g., clockwise or counterclockwise). When the automated heading adjustment is activated, the direction to turn (left or right) to achieve the targeted heading can follow a hierarchy. For example, if the operator is providing a left or right turn rate input via the control stick, the vehicle control and interface system 100 can retain the turn rate and direction to capture the heading bug. If there is no turn rate input via the control stick, the vehicle control and interface system 100 can utilize the standard turn rate (e.g., three degrees/second) and the shortest path to the target heading. Alternatively, if the operator moves the heading bug in such a manner that it crosses the current heading, the vehicle control and interface system 100 can utilize the direction the operator moves the heading wheel 403 to capture the targeted heading.

The "Heading" button on the header 404 can present dynamic information about the direction of the turn intended to be captured via the heading wheel 403 with a right or left arrow (e.g., an arrow displayed next to the "Heading" text of the button). The automated heading adjustment can require direct operator interaction to deactivate once the heading bug is captured. This may be different from the automated speed and altitude adjustments, which can automatically be deactivated by the vehicle control and interface system 100 upon capture. In some embodiments, the automated heading adjustment can be deactivated by: (1) tapping the "Heading" button on the header 404, (2) actively commanding a turn rate via a control stick, (3) engaging a Lateral control, or (4) interaction with a TCD element to disengage the heading adjustment.

An operator may interact with the altitude tape 402 to increase the targeted altitude with an upward swipe movement and decrease the targeted altitude with a downward swipe movement. Once the altitude bug is set, it can be activated by tapping the "Altitude" button on the header 404. If the operator is providing a vertical speed input toward the target altitude via the control stick, the vehicle control and interface system 100 can retain the vertical speed in seeking the altitude bug. If there is no vertical speed input toward the target altitude via the control stick at the time of activating the bug, the vehicle control and interface system 100 can utilize a default rate.

The "Altitude" button on the header 404 can present dynamic information such as an up or down arrow, indicating if the aerial vehicle will ascend or descend upon selecting the button for automated altitude adjustment. Once aerial vehicle reaches the desired altitude specified by the altitude bug, the automated altitude adjustment may deactivate, and the vehicle control and interface system 100 can hold the altitude. Changing the altitude bug may not change the altitude automatically. A reactivation of the automated altitude adjustment may be required. During the execution of the automated altitude adjustment, if the altitude bug is updated, then the vehicle control and interface system 100 can capture the updated bug.

The GUI 400 includes an auto pickup slider 405 that an operator may interact with by sliding their finger upward. In response to the operator interaction, the vehicle control and interface system 100 may cause actuators of the aerial vehicle to bring the vehicle from the ground to a hovering position.

FIG. 5 shows a GUI 500 for initiating approach activation, in accordance with one embodiment. The GUI 500 includes a speed tape 501, an altitude tape 502, a heading wheel 503, and an automated vehicle control header 504 that function similarly to the corresponding GUI elements of FIG. 4 (e.g., the speed tape 401 functions similarly to the speed tape 501). The GUI 500 includes an "Activate Approach" button 505 that, upon operator interaction, causes the aerial vehicle to prepare for and undergo an approach to its target destination (e.g., activate horizontal navigation for an approach). The GUI 500 includes a lateral guidance initiation element 506 and a vertical guidance initiation element 507. The lateral guidance initiation element 506 indicates a lateral guidance route (e.g., from a starting destination labeled "GOODI" to an ending destination labeled "LAZYE"). The lateral guidance initiation element 506 can be operator interactable to engage an aerial vehicle in a flight plan that includes the lateral guidance route. The vertical guidance initiation element 507 can indicate a vertical guidance route or an altitude change (e.g., descending eighteen hundred feet). The vertical guidance initiation element 507 can be operator interactable to engage the aerial vehicle in the vertical guidance route of the flight plan. The vertical guidance initiation element 507 can further be conditionally disabled from operator interaction until at least an operator interacts with the lateral guidance initiation element. For example, the vertical guidance initiation element 507 is displayed but no change in vehicle operation will occur if the operator interacts with the element 507 until the operator also interacts with the element 506. That is, the vertical guidance initiation element 507 can be displayed as disarmed until the operator interacts with the lateral guidance initiation element 506.

Once an operator interacts with the lateral guidance initiation element 506, the vehicle control and interface system 100 can update the lateral guidance initiation element 506 to visually indicate that the aerial vehicle is engaged in automatic lateral control according to the lateral guidance route. Updating the lateral guidance initiation element 506 can include removing the lateral guidance route from display. For example, while the lateral guidance route is displayed in the element 506, the lateral guidance route is no longer displayed in the element 606 of FIG. 6, which has been interacted with by the operator to engage Lateral control. Additionally, once the operator interacts with the vertical guidance initiation element 507 while the aerial vehicle is engaged in automatic lateral control, the vehicle control and interface system 100 can update the vertical guidance initiation element to visually indicate that the aerial vehicle is engaged in automatic vertical control according to the vertical guidance route. Updating the vertical guidance initiation element 507 can include removing the vertical guidance route from display. For example, while the vertical guidance route is displayed in the element 507, the vertical guidance route is no longer displayed in the element 607 of FIG. 6. If the operator interacts with the vertical guidance initiation element 507 while the aerial vehicle is not engaged in automatic lateral control, the vehicle control and interface system 100 can maintain a current altitude of the aerial vehicle.

FIG. 6 shows a GUI 600 for activating approach, in accordance with one embodiment. The GUI 600 includes a speed tape 601, an altitude tape 602, a heading wheel 603, and an automated vehicle control header 604 that function similarly to the corresponding GUI elements of FIGS. 4 and 5 (e.g., the speed tape 401 functions similarly to the speed tape 601). The GUI 600 includes a lateral guidance initiation element 606 and a vertical guidance initiation element 607, which are displayed in an engaged display state as compared to the armed display state of the lateral guidance initiation element 506 and the disarmed display state of the vertical guidance initiation element 507 (due to the element 506 not yet being engaged). The GUI 600 further includes an automated vehicle control header 608 that display information about the automated vehicle control (e.g., the next waypoint, distance to the next waypoint, target altitude, etc.).

FIG. 7 shows a GUI 700 for initiating setdown, in accordance with one embodiment. The GUI 700 includes a speed tape 701, an altitude tape 702, a heading wheel 703, and an automated vehicle control header 704 that function similarly to the corresponding GUI elements of FIGS. 4-6 (e.g., the speed tape 401 functions similarly to the speed tape 701). The GUI 700 includes an auto setdown slider 705 that an operator may interact with by sliding their finger downward. In response to the operator interaction, the vehicle control and interface system 100 may cause actuators of the aerial vehicle to bring the vehicle from a hovering position to the ground.

Figure 8:
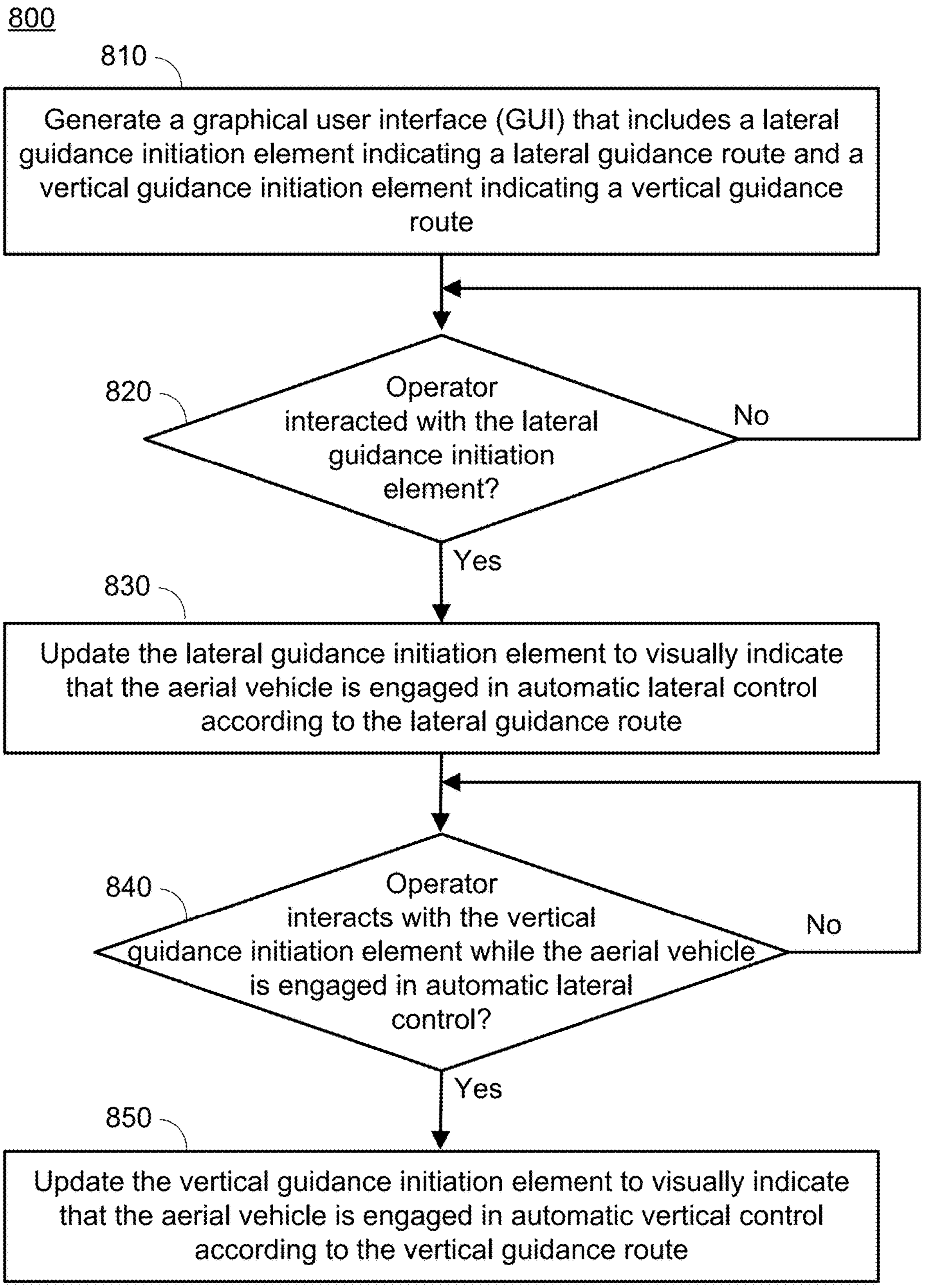
FIG. 8 is a flowchart of a process for initiating lateral and vertical navigation controls, in accordance with one embodiment.

FIG. 8 is a flowchart of a process 800 for initiating Lateral and Vertical controls, in accordance with one embodiment. The process 800 may be performed by the vehicle control and interface system 100. The process 800 may have additional, fewer, or different operations.

The vehicle control and interface system 100 generates 810 a GUI that includes a lateral guidance initiation element indicating a lateral guidance route and a vertical guidance initiation element indicating a vertical guidance route. FIG. 5 shows an example interface with both lateral and vertical guidance initiation elements indicating respective guidance routes. The vehicle control and interface system 100 determines 820 whether an operator has interacted with the lateral guidance initiation element. For example, a universal avionics control router of the vehicle control and interface system 100 determines whether the operator has tapped a button on a touchscreen interface to begin Lateral control.

If the system 100 determines that the operator has not interacted with the lateral guidance initiation element, the system 100 may continue to wait until the operator does interact. Else, if the system 100 determines that the operator has interacted with the lateral guidance initiation element, the vehicle control and interface system 100 updates 830 the lateral guidance initiation element to visually indicate that the aerial vehicle is engaged in automatic lateral control according to the lateral guidance route. For example, the vehicle control and interface system 100 can remove the lateral guidance route from the lateral guidance initiation element. The vehicle control and interface system 100 can also display a header (e.g., the header 608) displaying information (e.g., the next waypoint) indicating that the lateral guidance route is being followed.

The vehicle control and interface system 100 determines 840 whether the operator has interacted with the vertical guidance initiation element while the aerial vehicle is engaged in automatic lateral control. For example, the universal avionics control router of the vehicle control and interface system 100 determines whether the operator has tapped a button on a touchscreen interface to begin Vertical control. If the system 100 determines that the operator has not interacted with the vertical guidance initiation element, the system 100 may continue to wait until the operator does interact. Else, if the system 100 determines that the operator has interacted with the vertical guidance initiation element, the vehicle control and interface system 100 updates 850 the vertical guidance initiation element to visually indicate that the aerial vehicle is engaged in automatic vertical control according to the vertical guidance route. For example, the vehicle control and interface system 100 can remove the vertical guidance route from the vertical guidance initiation element (e.g., as shown in FIG. 6).

Computing Machine Architecture

Figure 9:
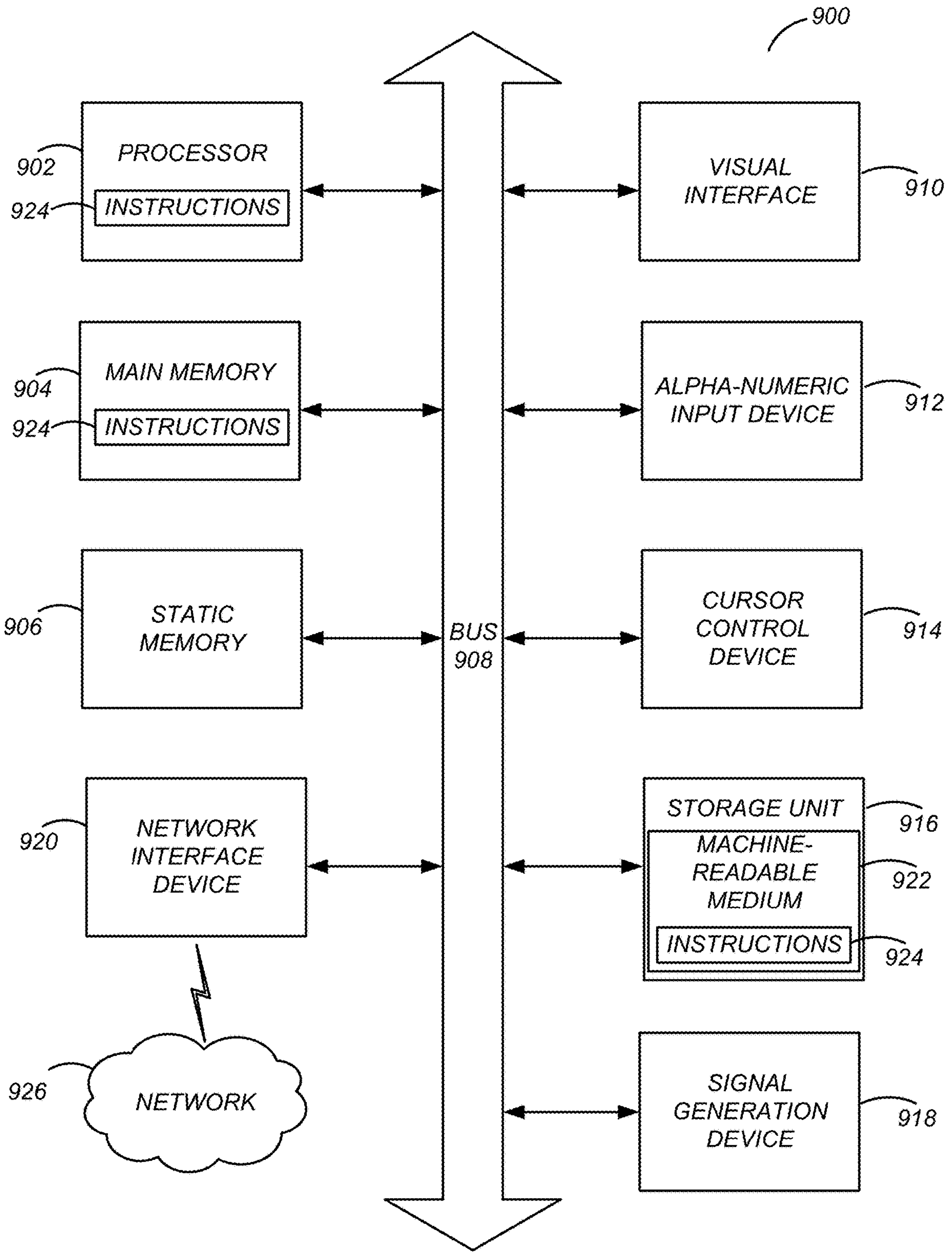
FIG. 9 is a block diagram illustrating one example embodiment of components of an example machine able to read instructions from a machine-readable medium and execute them in a processor (or controller).

FIG. 9 is a block diagram illustrating one embodiment of components of an example machine able to read instructions from a machine-readable medium and execute them in a processor (or controller). Specifically, FIG. 9 shows a diagrammatic representation of a machine in the example form of a computer system 900 within which program code (e.g., software) for causing the machine to perform any one or more of the methodologies discussed herein may be executed. The computer system 900 may be used for one or more components of the vehicle control and interface system 100. The program code may be comprised of instructions 924 executable by one or more processors 902. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 924 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 900 includes one or more processors 902 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 904, and a static memory 906, which are configured to communicate with each other via a bus 908. The computer system 900 may further include visual display interface 910. The visual interface may include a software driver that enables (or provide) user interfaces to render on a screen either directly or indirectly. The visual interface 910 may interface with a touch enabled screen. The computer system 900 may also include input devices 912 (e.g., a keyboard), a cursor control device 914 (e.g., a mouse), a storage unit 916, a signal generation device 918 (e.g., a microphone and/or speaker), and a network interface device 920, which also are configured to communicate via the bus 908.

The storage unit 916 includes a machine-readable medium 922 (e.g., magnetic disk or solid-state memory) on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution.

Additional Configuration Considerations

The disclosed systems may increase vehicle safety by providing a full fly-by-wire (FBW) architecture with a redundant architecture. For example, the FBW architecture may comprise triple redundancy, quadruple redundancy, or any other suitable level of redundancy. The systems may enable retrofitting an existing vehicle with an autonomous agent (and/or enable autonomous agent certification) by providing a sufficient degree of control and power redundancy to autonomous agents.

The disclosed systems may enable autonomous and/or augmented control schemes without relying on the pilot (or other operator) as a backup in the event of power failure. Accordingly, such systems may fully eliminate the 'direct human control' layer because augmented modes are persistent in the event of multiple power failures (e.g., augmented control modes can rely on triply-redundant, continuous backup power). Such systems may allow transportation providers and users to train in only a normal mode, thereby decreasing or eliminating training for 'direct' or 'manual' modes (where they are the backup; and relied upon to provide mechanical actuation inputs). Such systems may further reduce the cognitive load on pilots in safety-critical and/or stressful situations, since they can rely on persistent augmentation during all periods of operation. The systems are designed with sufficient redundancy that the vehicle may be operated in normal mode at all times. In contrast, conventional systems generally force operators to train in multiple backup modes of controlling an aerial vehicle.

The disclosed systems may reduce vehicle mass and/or cost (e.g., especially when compared to equivalently redundant systems). By co-locating multiple flight critical components within a single housing, systems can reduce the cable length, minimize the number of distinct connections required for vehicle integration (thereby improving ease of assembly), and allow use of less expensive sensors and/or processors without an electronics bay (e.g., as individual components can often require unique electrical and/or environmental protections).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Further, unless expressly stated to the contrary, "or" refers to an inclusive or and not to an exclusive or. For example, a condition A or B is satisfied by any one of the following: A is true (or present), and B is false (or not present), A is false (or not present) and B is true (or present), and both A and B are true (or present).

Upon reading this disclosure, those of skill in the art will appreciate still additional alternative structural and functional designs for a system and a process for universal vehicle control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable storage medium configured to store instructions, the instructions when executed by a processor of an aerial vehicle control and interface system cause the aerial vehicle control and interface system to:
- generate a graphical user interface (GUI) comprising:
  - a lateral guidance initiation element indicating a lateral guidance route, wherein the lateral guidance initiation element is operator interactable to engage an aerial vehicle in a flight plan comprising the lateral guidance route, and
  - a vertical guidance initiation element indicating a vertical guidance route, wherein the vertical guidance initiation element is:
  - operator interactable to engage the aerial vehicle in the vertical guidance route of the flight plan, and
  - conditionally disabled from operator interaction until at least an operator interacts with the lateral guidance initiation element, wherein a current altitude of the aerial vehicle is maintained when the operator interacts with the conditionally disabled vertical guidance initiation element;
- update the lateral guidance initiation element to visually indicate that the aerial vehicle is engaged in automatic lateral control according to the lateral guidance route when the operator interacts with the lateral guidance initiation element; and
- update the vertical guidance initiation element to visually indicate that the aerial vehicle is engaged in automatic vertical control according to the vertical guidance route when the operator interacts with the vertical guidance initiation element while the aerial vehicle is engaged in automatic lateral control.

2. The non-transitory computer-readable storage medium of claim 1, wherein the vertical guidance initiation element is displayed as disarmed until the operator interacts with the lateral guidance initiation element.

3. The non-transitory computer-readable storage medium of claim 1, wherein the instructions to update the lateral guidance initiation element, when executed by the processor, further cause the aerial vehicle control and interface system to remove the lateral guidance route from display.

4. The non-transitory computer-readable storage medium of claim 1, wherein the instructions to update the vertical guidance initiation element, when executed by the processor, further cause the aerial vehicle control and interface system to remove the vertical guidance route from display.

5. The non-transitory computer-readable storage medium of claim 1, wherein the lateral guidance route comprises a start destination label and an end destination label.

6. The non-transitory computer-readable storage medium of claim 1, wherein the vertical guidance route comprises an altitude change.

7. The non-transitory computer-readable storage medium of claim 1, wherein the GUI is displayed on a touch screen of the aerial vehicle.

8. The non-transitory computer-readable storage medium of claim 7, wherein the GUI further comprises a speed tape, wherein the speed tape is operator interactable with a swiping gesture to engage the aerial vehicle at a target speed.

9. The non-transitory computer-readable storage medium of claim 7, wherein the GUI further comprises an altitude tape, wherein the altitude tape is operator interactable with a swiping gesture to engage the aerial vehicle at a target altitude.

10. The non-transitory computer-readable storage medium of claim 7, wherein the GUI further comprises a heading wheel, wherein the heading wheel is operator interactable with a rotating gesture to engage the aerial vehicle at a target heading, the rotating gesture comprising one or more fingers moving in a circle.

11. The non-transitory computer-readable storage medium of claim 7, wherein the instructions further comprise instructions that, when executed by the processor, cause the aerial vehicle control and interface system to:

receive a first operator interaction with the GUI at the touch screen;

receive a second operator interaction with the GUI at a control stick of the aerial vehicle, wherein the first operator interaction and the second operator interaction are received within a predefined time window; and determine, based on a hierarchy of control inputs, to override one of the first operator interaction or second operator interaction.

12. The non-transitory computer-readable storage medium of claim 1, wherein the instructions further comprise instructions that, when executed by the processor, cause the aerial vehicle control and interface system to:

calculate a distance until the aerial vehicle reaches a destination of the lateral guidance route when the operator interacts with the lateral guidance initiation element; and update the GUI to display the calculated distance.

13. A method comprising:

generating a graphical user interface (GUI) comprising:

a lateral guidance initiation element indicating a lateral guidance route, wherein the lateral guidance initiation element is operator interactable to engage an aerial vehicle in a flight plan comprising the lateral guidance route, and a vertical guidance initiation element indicating a vertical guidance route, wherein the vertical guidance initiation element is:

operator interactable to engage the aerial vehicle in the vertical guidance route of the flight plan, and conditionally disabled from operator interaction until at least an operator interacts with the lateral guidance initiation element, wherein a current altitude of the aerial vehicle is maintained when the operator interacts with the conditionally disabled vertical guidance initiation element;

responsive to the operator interacting with the lateral guidance initiation element, updating the lateral guidance initiation element to visually indicate that the aerial vehicle is engaged in automatic lateral control according to the lateral guidance route; and responsive to the operator interacting with the vertical guidance initiation element while the aerial vehicle is engaged in automatic lateral control, updating the vertical guidance initiation element to visually indicate that the aerial vehicle is engaged in automatic vertical control according to the vertical guidance route.

14. The method of claim 13, wherein the vertical guidance initiation element is displayed as disarmed until the operator interacts with the lateral guidance initiation element.

15. The method of claim 13, wherein updating the lateral guidance initiation element comprises removing the lateral guidance route from display.

16. An aerial vehicle control and interface system comprising:

a universal vehicle control interface for an aerial vehicle, the universal vehicle control interface configured to:

receive input commands from an operator of the aerial vehicle; and display a graphical user interface (GUI) comprising:

a lateral guidance initiation element indicating a lateral guidance route, wherein the lateral guidance initiation element is operator interactable to engage an aerial vehicle in a flight plan comprising the lateral guidance route, and a vertical guidance initiation element indicating a vertical guidance route, wherein the vertical guidance initiation element is:

operator interactable to engage the aerial vehicle in the vertical guidance route of the flight plan, and conditionally disabled from operator interaction until at least the operator interacts with the lateral guidance initiation element, wherein a current altitude of the aerial vehicle is maintained when the operator interacts with the conditionally disabled vertical guidance initiation element; and a universal avionics control router configured to:

generate the GUI;

update the lateral guidance initiation element to visually indicate that the aerial vehicle is engaged in automatic lateral control according to the lateral guidance route when the operator interacts with the lateral guidance initiation element; and update the vertical guidance initiation element to visually indicate that the aerial vehicle is engaged in automatic vertical control according to the vertical guidance route when the operator interacts with the vertical guidance initiation element while the aerial vehicle is engaged in automatic lateral control.

17. The aerial vehicle control and interface system of claim 16, wherein the vertical guidance initiation element is displayed as disarmed until the operator interacts with the lateral guidance initiation element.

18. The aerial vehicle control and interface system of claim 16, wherein the universal avionics control router is configured to update the lateral guidance initiation element by removing the lateral guidance route from display.

19. The aerial vehicle control and interface system of claim 16, wherein the GUI further comprises a speed tape, wherein the speed tape is operator interactable with a swiping gesture to engage the aerial vehicle at a target speed.

20. The aerial vehicle control and interface system of claim 16, wherein the universal vehicle control interface is further configured to:

receive a first operator interaction with the GUI at a touch screen of the aerial vehicle;

receive a second operator interaction with the GUI at a control stick of the aerial vehicle, wherein the first operator interaction and the second operator interaction are received within a predefined time window; and wherein the universal avionics control router is further configured to determine, based on a hierarchy of control inputs, to override one of the first operator interaction or the second operator interaction.

* * * * *